United States Patent
Junger et al.

(10) Patent No.: US 11,175,128 B2
(45) Date of Patent: Nov. 16, 2021

(54) QUALITY CONTROL OF SUBSTRATE COATINGS

(71) Applicant: Vaxxas Pty Limited, Sydney (AU)

(72) Inventors: Michael Carl Junger, Brookfield (AU); Christopher Flaim, Chapel Hill (AU)

(73) Assignee: VAXXAS PTY LIMITED, Sydney (AU)

(*) Notice: Subject to any disclaimer, the term of this patent is extended or adjusted under 35 U.S.C. 154(b) by 0 days.

(21) Appl. No.: 16/622,092

(22) PCT Filed: Jun. 13, 2018

(86) PCT No.: PCT/AU2018/050586
§ 371 (c)(1),
(2) Date: Dec. 12, 2019

(87) PCT Pub. No.: WO2018/227246
PCT Pub. Date: Dec. 20, 2018

(65) Prior Publication Data
US 2020/0182605 A1  Jun. 11, 2020

Related U.S. Application Data

(60) Provisional application No. 62/603,841, filed on Jun. 13, 2017.

(51) Int. Cl.
*G01B 11/06* (2006.01)
(52) U.S. Cl.
CPC ...... *G01B 11/0625* (2013.01); *G01B 11/0658* (2013.01)

(58) Field of Classification Search
CPC ....... G01N 33/0098; G01N 2021/4735; G01N 2021/8427; G01N 21/17; G01N 21/64;
(Continued)

(56) References Cited

U.S. PATENT DOCUMENTS 2,213,830 A   9/1940  Anastasi
2,881,500 A   4/1959  Furness
(Continued)

FOREIGN PATENT DOCUMENTS

CN    1149018 A    5/1997
CN    101214395 A  7/2008
(Continued)

OTHER PUBLICATIONS

Ma et al., "Coating solid dispersions on microneedles via a molten dip coating method: development and in vitro evaluation for transdermal delivery of a water insoluble drug," *J Pharm Sci* 103(11):3621-3630, 2014 (HHS Public Access Author manuscript, available in PMC Nov. 1, 2015)(21 pages).

(Continued)

*Primary Examiner* — Michael P Stafira
(74) *Attorney, Agent, or Firm* — Seed IP Law Group LLP

(57) ABSTRACT

The present invention relates to devices and methods for detecting the amount (degree, extent) of material coating a medical device or substrate, in particular the present invention relates to devices and methods for detecting the amount of vaccine material coating a microarray patch.

11 Claims, 22 Drawing Sheets

(58) Field of Classification Search
CPC ....... G01N 21/8422; G01N 2291/0289; G01N 2291/044; G01N 2291/102; G01N 2291/2638; G01N 2333/21; G01N 29/04; G01N 29/043; G01N 29/2437; G01N 29/265; G01N 29/28; G01N 33/5044; G01N 33/5097; G01N 33/54353; G01N 33/68; G01N 33/50; G01N 33/5073; G01N 33/564; G01N 15/1404; G01N 2015/1081; G01N 2015/1409; G01N 2015/1411; G01N 2015/1413; G01N 2035/00019; G01N 2035/00316; G01N 2035/00356; G01N 21/00; G01N 21/255; G01N 21/63; G01N 21/76; G01N 21/78; G01N 21/82; G01N 2201/0221; G01N 2201/0256; G01N 2201/061; G01N 2201/068; G01N 2223/407; G01N 2223/5015; G01N 2291/02466; G01N 2333/705; G01N 2333/70589; G01N 23/22; G01N 2500/00; G01N 27/745; G01N 2800/00; G01N 2800/24; G01N 2800/347; G01N 2800/52; G01N 29/02; G01N 33/48; G01N 33/4836; G01N 33/4875; G01N 33/5008; G01N 33/5014; G01N 33/5023; G01N 33/5026; G01N 33/5058; G01N 33/5088; G01N 33/5091; G01N 33/53; G01N 33/5302; G01N 33/543; G01N 33/54326; G01N 33/54373; G01N 33/5438; G01N 33/54386; G01N 33/557; G01N 33/6854; G01N 35/00; G01N 35/00871; G01N 35/1016; G01N 35/1095; G01B 11/0625; G01B 11/0658; G01B 11/18; G01B 11/24; G02B 27/30; G02B 26/101; G02B 26/0833; G02B 26/10; G02B 26/122; G02B 26/0841; G02B 26/085; G02B 26/12; G02B 7/1821; G02B 1/005; G02B 2006/12195; G02B 2207/101; G02B 26/08; G02B 26/0858; G02B 26/105; G02B 27/0955; G02B 27/0977; G02B 5/09; G02B 5/26; G02B 6/0021; G02B 6/0028; G02B 6/02042; G02B 6/02047; G02B 6/02085; G02B 6/02142; G02B 6/0288; G02B 6/122; G02B 6/132; G02B 6/136; G02B 6/4274; G02B 6/43; G02B 6/4416; G01J 1/0425

See application file for complete search history.

(56) References Cited

U.S. PATENT DOCUMENTS

| | | | |
|---|---|---|---|
| 4,702,799 A | 10/1987 | Tuot | |
| 5,017,007 A * | 5/1991 | Milne | G01N 21/658 356/301 |
| 5,201,992 A | 4/1993 | Marcus et al. | |
| 5,353,792 A | 10/1994 | Lubbers et al. | |
| 5,449,064 A | 9/1995 | Hogan et al. | |
| 5,457,041 A | 10/1995 | Ginaven et al. | |
| 5,461,482 A | 10/1995 | Wilson et al. | |
| 5,499,474 A | 3/1996 | Knooihuizen | |
| 5,527,288 A | 6/1996 | Gross et al. | |
| 5,611,806 A | 3/1997 | Jang | |
| 5,657,138 A | 8/1997 | Lewis et al. | |
| 5,859,937 A | 1/1999 | Nomura | |
| 5,922,356 A | 7/1999 | Koseki et al. | |
| 5,928,207 A | 7/1999 | Pisano et al. | |
| 5,943,075 A | 8/1999 | Lee et al. | |
| 6,052,652 A | 4/2000 | Lee | |
| 6,233,797 B1 | 5/2001 | Neely et al. | |
| 6,287,556 B1 | 9/2001 | Portnoy et al. | |
| 6,299,621 B1 | 10/2001 | Fogarty et al. | |
| 6,334,856 B1 | 1/2002 | Allen et al. | |
| 6,352,697 B1 | 3/2002 | Cox et al. | |
| 6,454,755 B1 | 9/2002 | Godshall | |
| 6,463,312 B1 | 10/2002 | Bergveld et al. | |
| 6,478,738 B1 | 11/2002 | Hirabayashi et al. | |
| 6,503,231 B1 | 1/2003 | Prausnitz et al. | |
| 6,533,949 B1 | 3/2003 | Yeshurun et al. | |
| 6,537,242 B1 | 3/2003 | Palmer | |
| 6,537,264 B1 | 3/2003 | Cormier et al. | |
| 6,551,849 B1 | 4/2003 | Kenney | |
| 6,557,849 B2 | 5/2003 | Wyss | |
| 6,558,361 B1 | 5/2003 | Yeshurun | |
| 6,565,532 B1 | 5/2003 | Yuzhakov et al. | |
| 6,589,202 B1 | 7/2003 | Powell | |
| 6,591,124 B2 | 7/2003 | Sherman et al. | |
| 6,610,382 B1 | 8/2003 | Kobe et al. | |
| 6,743,211 B1 | 6/2004 | Prausnitz et al. | |
| 6,743,581 B1 * | 6/2004 | Vo-Dinh | G01N 33/54373 506/39 |
| 6,749,575 B2 | 6/2004 | Matriano et al. | |
| 6,855,372 B2 | 2/2005 | Trautman et al. | |
| 6,881,203 B2 | 4/2005 | Delmore | |
| 6,908,453 B2 | 6/2005 | Fleming et al. | |
| 6,923,764 B2 | 8/2005 | Aceti et al. | |
| 6,931,277 B1 | 8/2005 | Yuzhakov et al. | |
| 6,945,952 B2 | 9/2005 | Kwon | |
| 7,022,071 B2 | 4/2006 | Schaupp et al. | |
| 7,045,069 B2 | 5/2006 | Ozeryansky | |
| 7,048,723 B1 | 5/2006 | Frazier et al. | |
| 7,097,631 B2 | 8/2006 | Trautman et al. | |
| 7,169,600 B2 | 1/2007 | Hoss et al. | |
| 7,211,062 B2 | 5/2007 | Kwon | |
| 7,250,037 B2 | 7/2007 | Shermer et al. | |
| 7,316,665 B2 | 1/2008 | Laurent et al. | |
| 7,753,888 B2 | 7/2010 | Mukerjee et al. | |
| 8,052,633 B2 | 11/2011 | Kendall | |
| 8,062,573 B2 | 11/2011 | Kwon | |
| 8,267,889 B2 | 9/2012 | Cantor et al. | |
| 8,414,548 B2 | 4/2013 | Yuzhakov | |
| 8,540,672 B2 | 9/2013 | McAllister | |
| 8,734,697 B2 | 5/2014 | Chen et al. | |
| 8,883,015 B2 | 11/2014 | Kendall et al. | |
| 9,283,365 B2 | 3/2016 | Kendall et al. | |
| 9,888,932 B2 | 2/2018 | Kendall | |
| 9,943,673 B2 | 4/2018 | Kendall et al. | |
| 10,022,322 B2 | 7/2018 | Kendall et al. | |
| 10,422,881 B1 * | 9/2019 | Wang | G01S 17/931 |
| 11,029,287 B2 * | 6/2021 | Wang | A61B 5/0095 |
| 2002/0008530 A1 | 1/2002 | Kim et al. | |
| 2002/0016562 A1 | 2/2002 | Cormier et al. | |
| 2002/0032415 A1 | 3/2002 | Trautman et al. | |
| 2002/0128599 A1 | 9/2002 | Cormier et al. | |
| 2002/0133129 A1 | 9/2002 | Arias et al. | |
| 2002/0169411 A1 | 11/2002 | Sherman et al. | |
| 2002/0177839 A1 | 11/2002 | Cormier et al. | |
| 2003/0036710 A1 | 2/2003 | Matriano et al. | |
| 2003/0199810 A1 | 10/2003 | Trautman et al. | |
| 2003/0199811 A1 | 10/2003 | Sage | |
| 2004/0002121 A1 | 1/2004 | Regan et al. | |
| 2004/0004649 A1 | 1/2004 | Bibl et al. | |
| 2004/0008241 A1 | 1/2004 | Junhua | |
| 2004/0039397 A1 | 2/2004 | Weber et al. | |
| 2004/0049150 A1 | 3/2004 | Dalton et al. | |
| 2004/0087992 A1 | 5/2004 | Kobe et al. | |
| 2004/0161470 A1 | 8/2004 | Andrianov et al. | |
| 2005/0042866 A1 | 2/2005 | Klapproth et al. | |
| 2005/0089553 A1 | 4/2005 | Cormier | |
| 2005/0089554 A1 | 4/2005 | Cormier et al. | |
| 2005/0126710 A1 | 6/2005 | Laermer et al. | |
| 2005/0137531 A1 | 6/2005 | Prausnitz et al. | |
| 2005/0143713 A1 | 6/2005 | Delmore et al. | |
| 2005/0197308 A1 | 9/2005 | Dalton et al. | |
| 2005/0261632 A1 | 11/2005 | Xu | |
| 2006/0012780 A1 | 1/2006 | Nishiyama et al. | |
| 2006/0015061 A1 | 1/2006 | Kuo et al. | |
| 2006/0055724 A1 | 3/2006 | Krawczyk et al. | |

(56) References Cited

U.S. PATENT DOCUMENTS

| | | |
|---|---|---|
| 2006/0000743 A1 | 4/2006 | Kwon |
| 2006/0195125 A1 | 8/2006 | Sakakine et al. |
| 2006/0202385 A1 | 9/2006 | Xu et al. |
| 2006/0264782 A1 | 11/2006 | Holmes et al. |
| 2007/0027474 A1 | 2/2007 | Lasner |
| 2007/0060867 A1 | 3/2007 | Xu |
| 2007/0078376 A1 | 4/2007 | Smith |
| 2007/0224252 A1 | 9/2007 | Trautman et al. |
| 2007/0264749 A1 | 11/2007 | Birkmeyer |
| 2007/0270738 A1 | 11/2007 | Wu |
| 2007/0293815 A1 | 12/2007 | Chan et al. |
| 2007/0299388 A1 | 12/2007 | Chan et al. |
| 2008/0009811 A1 | 1/2008 | Cantor |
| 2008/0108959 A1 | 5/2008 | Jung et al. |
| 2008/0114298 A1 | 5/2008 | Cantor et al. |
| 2008/0136874 A1 | 6/2008 | Tsukamura |
| 2008/0245764 A1 | 10/2008 | Pirk et al. |
| 2008/0287858 A1 | 11/2008 | Duan |
| 2008/0312610 A1 | 12/2008 | Binks |
| 2008/0312669 A1 | 12/2008 | Vries et al. |
| 2009/0017210 A1 | 1/2009 | Andrianov |
| 2009/0041810 A1 | 2/2009 | Andrianov et al. |
| 2009/0198189 A1 | 8/2009 | Simons et al. |
| 2009/0292254 A1 | 11/2009 | Tomono |
| 2010/0156998 A1 | 6/2010 | Matsumoto et al. |
| 2010/0221314 A1 | 9/2010 | Matsudo et al. |
| 2010/0222743 A1 | 9/2010 | Fredrickson et al. |
| 2010/0256568 A1 | 10/2010 | Frederickson et al. |
| 2011/0021996 A1 | 1/2011 | Lee et al. |
| 2011/0028905 A1 | 2/2011 | Takada |
| 2011/0059150 A1 | 3/2011 | Kendall et al. |
| 2011/0160069 A1 | 6/2011 | Corrie et al. |
| 2011/0223542 A1 | 9/2011 | Kendall et al. |
| 2011/0245776 A1 | 10/2011 | Kendall et al. |
| 2011/0276027 A1 | 11/2011 | Trautman et al. |
| 2011/0288484 A1 | 11/2011 | Kendall et al. |
| 2012/0027810 A1 | 2/2012 | Chen et al. |
| 2012/0041412 A1 | 2/2012 | Roth |
| 2012/0083741 A1 | 4/2012 | Kendall et al. |
| 2012/0083762 A1 | 4/2012 | Kendall |
| 2012/0109065 A1 | 5/2012 | Backes |
| 2012/0136312 A1 | 5/2012 | Terahara et al. |
| 2012/0220981 A1 | 8/2012 | Soo et al. |
| 2012/0265141 A1 | 10/2012 | Kalpin et al. |
| 2012/0277629 A1 | 11/2012 | Bernstein et al. |
| 2012/0330250 A1 | 12/2012 | Kuwahara et al. |
| 2013/0079666 A1 | 3/2013 | Gonzalez-Zugasti et al. |
| 2013/0131598 A1 | 5/2013 | Trautman et al. |
| 2013/0150822 A1 | 6/2013 | Ross |
| 2013/0158482 A1 | 6/2013 | Davis et al. |
| 2013/0190794 A1 | 7/2013 | Kendall et al. |
| 2013/0337150 A1 | 12/2013 | Biemans |
| 2014/0243747 A1 | 8/2014 | Tokumoto et al. |
| 2014/0002763 A1 | 9/2014 | Bourne et al. |
| 2014/0257188 A1 | 9/2014 | Kendall et al. |
| 2014/0276378 A1 | 9/2014 | Chen et al. |
| 2015/0057604 A1 | 2/2015 | Arami et al. |
| 2015/0080844 A1 | 3/2015 | Donovan et al. |
| 2016/0015952 A1* | 1/2016 | Omachi ............... A61K 9/0021 604/46 |
| 2016/0058697 A1 | 3/2016 | Kendall et al. |
| 2016/0220803 A1 | 8/2016 | Kendall et al. |
| 2016/0265733 A1* | 9/2016 | Bauer .................... F21S 41/20 |
| 2016/0310412 A1 | 10/2016 | Tanoue et al. |
| 2017/0182301 A1 | 6/2017 | Kendall |
| 2017/0239458 A1 | 8/2017 | Kato et al. |
| 2017/0282417 A1 | 10/2017 | Okano et al. |
| 2017/0296465 A1 | 10/2017 | Yoshida et al. |
| 2017/0361082 A1 | 12/2017 | Okano et al. |
| 2017/0368322 A1 | 12/2017 | Kato et al. |
| 2018/0015271 A1 | 1/2018 | Junger et al. |
| 2018/0161050 A1 | 6/2018 | Kendall |
| 2018/0263641 A1 | 9/2018 | Crichton et al. |
| 2018/0264244 A1 | 9/2018 | Meliga et al. |
| 2018/0326726 A1 | 11/2018 | Wang et al. |
| 2019/0046479 A1 | 2/2019 | Pathak |
| 2020/0246545 A1 | 8/2020 | Langer et al. |

FOREIGN PATENT DOCUMENTS

| | | |
|---|---|---|
| CN | 101297989 A | 11/2008 |
| EP | 0 139 286 A2 | 5/1985 |
| EP | 0 732 208 A1 | 9/1996 |
| EP | 1 695 734 B1 | 6/2008 |
| EP | 2 213 284 A1 | 8/2010 |
| EP | 2 327 419 A1 | 6/2011 |
| EP | 2 568 174 A1 | 3/2013 |
| EP | 2 835 147 A1 | 2/2015 |
| JP | 2003-127430 A | 5/2003 |
| JP | 2007-260889 A | 11/2007 |
| JP | 2010-071845 A | 4/2010 |
| JP | 2010071845 A * | 4/2010 |
| JP | 2016-166769 A | 9/2016 |
| JP | 2016166769 A * | 9/2016 |
| WO | 91/06571 A1 | 5/1991 |
| WO | 94/24281 A1 | 10/1994 |
| WO | 98/28037 A1 | 7/1998 |
| WO | 98/28038 A1 | 7/1998 |
| WO | 99/02694 A1 | 1/1999 |
| WO | 99/42564 A2 | 8/1999 |
| WO | 99/64580 A1 | 12/1999 |
| WO | 00/05339 A1 | 2/2000 |
| WO | 00/42215 A1 | 7/2000 |
| WO | 00/74763 A2 | 12/2000 |
| WO | 00/74764 A1 | 12/2000 |
| WO | 01/33614 A1 | 5/2001 |
| WO | 01/85207 A2 | 11/2001 |
| WO | 02/064193 A2 | 8/2002 |
| WO | 02/074173 A2 | 9/2002 |
| WO | 02/075794 A2 | 9/2002 |
| WO | 02/085446 A2 | 10/2002 |
| WO | 02/085447 A2 | 10/2002 |
| WO | 2002/100476 A2 | 12/2002 |
| WO | 03/020359 A2 | 3/2003 |
| WO | 03/026732 A2 | 4/2003 |
| WO | 03/048031 A2 | 6/2003 |
| WO | 03/053258 A1 | 7/2003 |
| WO | 03/078925 A2 | 9/2003 |
| WO | 03/092785 A1 | 11/2003 |
| WO | 2004/000389 A2 | 12/2003 |
| WO | 2004/024224 A1 | 3/2004 |
| WO | 2005/049108 A2 | 6/2005 |
| WO | 2005/060621 A2 | 7/2005 |
| WO | 2005/069736 A2 | 8/2005 |
| WO | 2005/072630 A1 | 8/2005 |
| WO | 2005/123173 A1 | 12/2005 |
| WO | 2006/055795 A1 | 5/2006 |
| WO | 2006/055799 A1 | 5/2006 |
| WO | 2006/101459 A1 | 9/2006 |
| WO | 2006/108185 A1 | 10/2006 |
| WO | 2006/116281 A2 | 11/2006 |
| WO | 2006/138719 A1 | 12/2006 |
| WO | 2007/002123 A2 | 1/2007 |
| WO | 2007/002521 A2 | 1/2007 |
| WO | 2007/012114 A1 | 2/2007 |
| WO | 2007/030477 A2 | 3/2007 |
| WO | 2007/054090 A1 | 5/2007 |
| WO | 2007/061781 A1 | 5/2007 |
| WO | 2007/070004 A1 | 6/2007 |
| WO | 2007/080427 A2 | 7/2007 |
| WO | 2007/124411 A1 | 11/2007 |
| WO | 2007/127976 A2 | 11/2007 |
| WO | 2008/010681 A1 | 1/2008 |
| WO | 2008/011625 A2 | 1/2008 |
| WO | 2008/053481 A1 | 5/2008 |
| WO | 2008/069566 A1 | 6/2008 |
| WO | 2008/083209 A2 | 7/2008 |
| WO | 2008/091602 A2 | 7/2008 |
| WO | 2009/040548 A1 | 4/2009 |
| WO | 2009/066763 A1 | 5/2009 |
| WO | 2009/079712 A1 | 7/2009 |
| WO | 2009/081122 A1 | 7/2009 |
| WO | 2009/097660 A1 | 8/2009 |

(56) References Cited

FOREIGN PATENT DOCUMENTS

| WO | 2009/140735 A1 | 11/2009 |
|---|---|---|
| WO | 2010/042996 A1 | 4/2010 |
| WO | 2010/071918 A1 | 7/2010 |
| WO | 2010/109471 A1 | 9/2010 |
| WO | 2011/105496 A1 | 9/2011 |
| WO | 2011/116388 A1 | 9/2011 |
| WO | 2012/119907 A1 | 9/2012 |
| WO | 2012/122162 A1 | 9/2012 |
| WO | 2013/053022 A1 | 4/2013 |
| WO | 2013/055641 A1 | 4/2013 |
| WO | 2014/058746 A1 | 4/2014 |
| WO | 2015/034924 A1 | 3/2015 |
| WO | 2016/123665 A1 | 8/2016 |
| WO | 2016/143514 A1 | 9/2016 |
| WO | 2017/123652 A1 | 7/2017 |
| WO | 2018/119174 A1 | 6/2018 |

OTHER PUBLICATIONS

Aichele et al., "Antiviral Cytotoxic T Cell Response Induced By In Vivo Priming With a Free Synthetic Peptide," *J Exp. Med.* 171:1815-1820, 1990.

Albert et al., "Dendritic cells acquire antigen from apoptotic cells and induce class I-restricted CTLs," *Nature* 392:86-89, 1998.

Albert et al., "Tumor-specific killer cells in paraneoplastic cerebellar degeneration," *Nature Medicine* 4(11):1321-1324, 1998.

Anderson, "Cutaneous Microdialysis: Is it Worth the Sweat?" *Journal of Investigative Dermatology* 126:1207-1209, 2006.

Athanasopoulos et al., "Gene therapy vectors based on adeno-associated virus: Characterstics and applications to acquired and inherited diseases (Review)," *International Journal of Molecular Medicine* 6:363-375, 2000.

Australian Examination Report dated Apr. 11, 2016 for Australian Application No. 2012323782, 3 pages.

Australian Examination Report dated Jan. 9, 2017 for Australian Application No. 2012323782, 4 pages.

Australian Examination Report dated Mar. 27, 2013 for Australian Application No. 2009212106, 5 pages.

Bachmann et al., "Dendiritic cells process exogenous viral proteins and virus-like particles for class I presentation to CD8+ cytotoxic T lymphocytes," *Eur. J. Immunol.* 26:2595-2600, 1996.

Boehm et al., "Inkjet printing for pharmaceutical applications," *Materials Today* 17(5):247-252, 2014.

Camilli et al., "Listeria monocytogenes Mutants Lacking Phosphatidylinositol-specific Phospholipase C Are Avirulent," *J. Exp. Med.* 173:751-754, 1991.

Canadian Examination Report dated Apr. 23, 2015 for Canadian Application No. 2,749,347, 4 pages.

Canadian Examination Report dated Feb. 17, 2015 for Canadian Application No. 2,745,339, 4 pages.

Chinese Office Action dated Dec. 28, 2012 for Chinese Application No. 200980104635.3, 6 pages. (w/ English Translation).

Chinese Office Action dated Feb. 17, 2012 for Chinese Application No. 200980104635.3, 13 pages. (w/ English Translation).

Chinese Office Action dated Sep. 24, 2012 for Chinese Application No. 200980104635.3, 9 pages. (w/ English Translation).

Cormier et al., "Transdermal delivery of desmopressin using a coated microneedle array patch system," *Journal of Controlled Release* 97:503-511, 2004.

Cox et al., "Adjuvants—a classification and review of their modes of action," *Vaccine* 15(3):248-256, 1997.

Crichton et al., "The effect of strain rate on the precision of penetration of short densely-packed microprojection array patches coated with vaccine," *Biomaterials* 31:4562-4572, 2010.

Crichton et al., "The viscoelastic, hyperelastic and scale dependent behaviour of freshly excised individual skin layers," *Biomaterials* 32:4670-4681, 2011.

Desai et al., "Understanding release kinetics of biopolymer drug delivery microcapsules for biomedical applications," *Materials Science and Engineering B* 168:127-131, 2010.

Dreyer, "Microneedles:Microprocessing in Medicine," *ENMA465 Project*, May 10, 2004. (23 pages).

European Search Report dated Jul. 20, 2012 for European Application No. 09833918.7, 9 pages.

European Search Report dated Nov. 10, 2015 for European Application No. 12840561.0, 11 pages.

European Search Report dated Sep. 10, 2018, for European Application No. 16746000.5, 3 pages.

European Search Report dated Sep. 26, 2014 for European Application No. 09707729.1, 9 pages.

Feng et al., "Molecular Biomarkers for Cancer Detection in Blood and Bodily Fluids," *Critical Reviews in Clinical Laboratory Sciences* 43(5-6):497-560, 2006.

Fernando et al., "Potent Immunity to Low Doses of Influenza Vaccine by Probabilistic Guided Micro-Targeted Skin Delivery in a Mouse Model," *PLoS One* 5(4):e10266, 2010. (11 pages).

Gao et al., "Priming of Influenza Virus-Specific Cytotoxic T Lymphocytes Vivo By Short Synthetic Peptides," *The Journal of Immunology* 147(10):3268-3273, 1991.

Garafalo et al., "Histamine release and therapy of severe dermatographism," *J. Allergy Clin. Immunol.* 68(2):103-105, 1981.

Gardeniers et al., "Silicon Micromachined Hollow Microneedles for Transdermal Liquid Transport," *Journal of Microelectromechanical Systems* 12(6):855-862, 2003.

Gill et al., "Coated microneedles for transdermal delivery," *Journal of Controlled Release* 117:227-237, 2007.

Gill et al., "Coating Formulations for Microneedles," *Pharmaceutical Research* 24(7):1369-1380, 2007.

Henry et al., "Microfabricated Microneedles: A Novel Approach to Transdermal Drug Delivery," *Journal of Pharmaceutical Sciences* 87(8):922-925, 1998.

International Preliminary Report on Patentability dated Feb. 4, 2020 for International Application No. PCT/AU2018/050810, 9 pages.

International Preliminary Report on Patentability dated Jun. 29, 2010 for International Application No. PCT/AU2008/001903, 7 pages.

International Preliminary Report on Patentability dated Jun. 7, 2006 for International Application No. PCT/GB2005/000336, 9 pages.

International Preliminary Report on Patentability dated Nov. 14, 2012 for International Application No. PCT/AU2011/000890, 6 pages.

International Search Report dated Jul. 30, 2018, for International Application No. PCT/AU2018/050298, 6 pages.

International Search Report dated Sep. 13, 2018, for International Application No. PCT/AU2018/050847, 4 pages.

International Search Report dated Aug. 1, 2018, for International Application No. PCT/AU2018/050586, 4 pages.

International Search Report dated Dec. 22, 2016 for International Application No. PCT/AU2016/050907, 5 pages.

International Search Report dated Dec. 6, 2016 for International Application No. PCT/AU2016/050867, 12 pages.

International Search Report dated Feb. 20, 2009, for International Application No. PCT/AU2008/001903, 5 pages.

International Search Report dated Feb. 20, 2013 for International Application No. PCT/AU2012/001289, 13 pages.

International Search Report dated Mar. 7, 2016 for International Application No. PCT/AU2016/050056, 6 pages.

International Search Report dated Nov. 8, 2018, for International Application No. PCT/AU2018/050810, 8 pages.

International Search Report dated Oct. 25, 2011 for International Application No. PCT/AU2011/000890, 4 pages.

Ito et al., "Evaluation of self-dissolving needles containing low molecular weight heparin (LMWH) in rats," *International Journal of Pharmaceutics* 349:124-129, 2008.

Ito et al., "Feasibility of microneedles for percutaneous absorption of insulin," *European Journal of Pharmaceutical Sciences* 29:82-88, 2006.

Ito et al., "Self-dissolving microneedles for the percutaneous absorption of EPO in mice," *Journal of Drug Targeting* 14(5):255-261, 2006.

Jondal et al., "MHC Class I-Restricted CTL Responses to Exogenous Antigens," *Immunity* 5:295-302, 1996.

(56) References Cited

OTHER PUBLICATIONS

Kay et al., "Viral vectors for gene therapy: the art of turning infectious agents into vehicles of therapeutics," *Nature Medicine* 7(1):33-40, 2001.
Kendall et al., "The mechanical properties of the skin epidermis in relation to targeted gene and drug delivery," *Biomaterials* 28:4968-4977, 2007.
Kuzu et al., "In vivo priming effect during various stages of ontogeny of an influenza A virus nucleoprotein peptide," *Eur. J. Immunol.* 23:1397-1400, 1993.
Kwon, "Acne Treatment by a Dissolvable Micro-Needle Patch," TheraJect Inc., 2006. (2 pages).
Kwon, "In Vitro Evaluation of Transdermal Drug Delivery by a Micro-needle Patch," Controlled Release Society 31st Annual Meeting Transactions #115, 2006. (2 pages).
Kwon, "In Vitro Modeling of Transdermal PTH Delivery by Dissovling Micro-needle Patch," TherJect Inc., 2007. (2 pages).
Kwon, "Rapid Intradermal Drug Delivery by a Dissovable Micro-Needle Patch," Controlled Release Society 32nd Annual Meeting & Exposition Transactions #306, 2005. (2 pages).
Lee et al., "Dissolving microneedles for transdermal drug delivery," *Biomaterials* 29:2113-2124, 2008.
Lin et al., "Silicon-Processed Microneedles," *IEEE Journal of Microelectromechanical Systems* 8(1):78-84, 1999.
Ma et al., "A PZT Insulin Pump Integrated with a Silicon Micro Needle Array for Transdermal Drug Delivery," IEEE 56th Electronic Components & Technology Conference, 2006. (5 pages).
Matriano et al., "Macroflux R Microprojection Array Patch Technology: A New and Efficient Approach for Intracutaneous Immunization," *Pharmaceutical Research* 19(1):63-70, 2002.
McAllister et al., "Microfabricated needles for transdermal delivery of macromolecules and nanoparticles: Fabrication methods and transport studies," *PNAS* 100(24):13755-13760, 2003.
Meléndez et al., "Thermal Inkjet Application in the Preparation of Oral Dosage Forms: Dispensing of Prednisolone Solutions and Polymorphic Characterization by Solid-State Spectroscopic Techniques," *Journal of Pharmaceutical Sciences* 97(7):2619-2636, 2008.
Mengaud et al., "Expression in *Escherichia coli* and Sequence Analysis of the Listeriolysin O Determinant of *Listeria monocytogenes*," *Infection and Immunity* 56(4):766-772, 1988.
Miyano et al., "Sugar Micro Needles as Transdermic Drug Delivery System," *Biomedical Microdevices* 7(3):185-188, 2005.
Miyano et al., Hydrolytic Microneedles as Transdermal Drug Delivery System, IEEE The 14th International Conference on Solid-State Sensors, Actuators and Microsyystems, Lyon, France, pp. 355-358, Jun. 10-14, 2007.
Moore et al., "Introduction of Soluble Protein into the Class I Pathway of Antigen Processing and Presentation," *Cell* 54:777-785, 1988.
Mukerjee et al., "Microneedle array for transdermal biological fluid extraction and in situ analysis," *Sensors and Actuators A* 114:267-275, 2004.
Oh et al., "Demonstration of Dose-controlled Delivery by Dissolvable Micro-needle Arrays," 34th Annual Presented at CRS conference, Jun. 2007. (2 pages).
Oh et al., "Intradermal influenza vaccine delivery using skin-penetrating dissolveable vaccine microneedles," AAPS Annual Meeting and Exposition, 2006. (1 page).
Palmer et al., "Streptolysin O: A Proposed Model of Allosteric Interaction between a Pore-Forming Protein and its Target Lipid Bilayer," *Biochemistry* 37:2378-2383, 1998.
Park et al., "Biodegradable polymer microneedles: Fabrication, mechanics and transdermal drug delivery," *Journal of Controlled Release* 104:51-66, 2005.
Park et al., "Polymer Microneedles for Controlled-Release Drug Delivery," *Pharmaceutical Research* 23(5):1008-1019, 2006.
Park et al., "Towards the silicon nanowire-based sensor for intracellular biochemical detection," *Biosensors and Bioelectronics* 22:2065-2070, 2007.

Portnoy et al., "Capacity of Listeriolysin O, Streptolysin O, and Perfringolysin O to Mediate Growth of *Bacillus subtilis* within Mammalian Cells," *Infection & Immunity* 60(7):2710-2717, 1992.
Radulescu et al., "Uniform Paclitaxel-Loaded Biodegradable Microspheres Manufactured by Ink-Jet Technology," *Proc., the Winter Symposium and 11th International Symposium on Recent Advantages in Drug-Delivery Systems, Controlled Release Society*, Salt Lake City, Utah, 2003, 5 pages.
Rossjohn et al., "Structure of a Cholestrol-Binding, Thiol-Activated Cytolysin and a Model of its Membrane Form," *Cell* 89:685-692, 1997.
Sandler et al., "Inkjet Printing of Drug Substances and Use of Porous Substrates—Towards Individualized Dosing," *Journal of Pharmaceutical Sciences* 100(8):3386-3395, 2011.
Schulz et al., "Peptide-induced antiviral protection by cytotoxic T cells," *Proc. Natl. Acad. Sci. USA* 88:991-993, 1991.
Scoutaris et al., "ToF-SIMS analysis of chemical heterogenities in inkjet micro-array printed drug/polymer formulations," *J Mater Sci: Mater Med* 23:385-391, 2012.
Silver et al., "Viscoelastic Properties of Young and Old Human Dermis: A Proposed Molecular Mechanism for Elastic Energy Storage in Collagen and Elastin," *Journal of Applied Polymer Science* 86:1978-1985, 2002.
Stoeber et al., "Arrays of Hollow Out-of-Plane Microneedles for Drug Delivery," *Journal of Microelectromechanical Systems* 14(3):472-479, 2005.
Sullivan et al., "Minimally Invasive Protein Delivery with Rapidly Dissolving Polymer Microneedles," *Adv. Mater.* 20:933-938, 2008.
Tao et al., "A systematic study of dry etch process for profile control of silicon tips," *Microelectronic Engineering* 78-79:147-151, 2005.
Tarcha et al., "The Application of Ink-Jet Technology for the Coating and Loading of Drug-Eluting Stents," *Annals of Biomedical Engineering* 35(10):1791-1799, 2007.
Tsuchiya et al., "Development of Blood Extraction System for Health Monitoring System," *Biomedcal Microdevices* 7(4):347-353, 2005.
Tyagi et al., "Molecular Beacons: Probes that Fluoresce upon Hybridization," *Nature Biotechnology* 14:303-308, 1996.
Vigna et al., "Lentiviral vectors: excellent tools for experimental gene transfer and promising candidates for gene therapy," *The Journal of Gene Medicine*, 2:308-316, 2000.
Walther et al., "Viral Vectors for Gene Transfer," *Drugs* 60(2):249-271, 2000.
Wang et al., "Label-free hybridization detection of a single nucleotide mismatch by immobilization of molecular beacons on an agarose film," *Nucleic Acids Research* 30(12):e61, 2002. (9 pages).
Widera et al., "Effect of delivery parameters on immunization to ovalbumin following intracutaneous administration by a coated microneedle array patch system," *Vaccine* 24:1653-1664, 2006.
Wu et al., "Production of viral vectors for gene therapy applications," *Current Opinion in Biotechnology* 11:205-208, 2000.
Wu et al., "Solid free-form fabrication of drug delivery devices," *Journal of Controlled Release* 40:77-87, 1996.
Yuan et al., "Measuring microelastic properties of stratum corneum," *Colloids and Surfaces B: Biointerfaces* 48:6-12, 2006.
Zheng et al., "Multiplexed electrical detection of cancer markers with nanowire sensor Arrays," *Nature Biotechnology* 23(10):1294-1301, 2005.
Zhou et al., "Liposome-Mediated Cytoplasmic Delivery of Proteins: An Effective Means of Accessing the MHC Class I-Restricted Antigen Presentation Pathway," *Immunomethods* 4:229-235, 1994.
Australian Examination Report No. 1 dated Oct. 9, 2020 for Australian Application No. 2016333148, 5 pages.
Chinese Office Action dated Jan. 11, 2021 for Chinese Application No. 201880036675.8, 31 pages, (w/ machine translation).
Communication pursuant to Article 94(3) EPC, dated Jan. 19, 2021, for European Application No. 16 746 000.5, 4 pages.
Extended European Search Report dated Nov. 30, 2020 for European Application No. 18 77 6793, 10 pages.
Extended European Search Report dated Feb. 15, 2021 for European Application No. 18 81 6698, 8 pages.

(56) References Cited

OTHER PUBLICATIONS

Fernando et al., "Safety, tolerability, acceptability and immunogenicity of an influenza vaccine delivered to human skin by a novel high-density microprojection array patch (Nanopatch™)," *Vaccine* 36:3779-3788, 2018.

Fernando et al., "Influenza nucleoprotein DNA vaccination by a skin targeted, dry coated, densely packed microprojection array (Nanopatch) induces potent antibody and CD8+ T cell responses," *Journal of Controlled Release* 237:35-41, 2016.

International Search Report dated May 25, 2020 for International Application No. PCT/AU2020/050296, 6 pages.

Muller et al., "High-density microprojection array delivery to rat skin of low doses of trivalent inactivated poliovirus vaccine elicits potent neutralising antibody responses," *Scientific Reports* 7:12644, 2017. (10 pages).

Ng et al., "Potent response of QS-21 as a vaccine adjuvant in the skin when delivered with the Nanopatch, resulted in adjuvant dose sparing," *Scientific Reports* 6:29368, 2016. (12 pages).

Scoutaris et al., "Current Trends on Medical and Pharmaceutical Applications of Inkjet Printing Technology," *Pharm Res.* 33:1799-1816, 2016.

\* cited by examiner

- Tip - visible
- Lower Shaft - masked by adjacent projection
- Base - visible in between rows

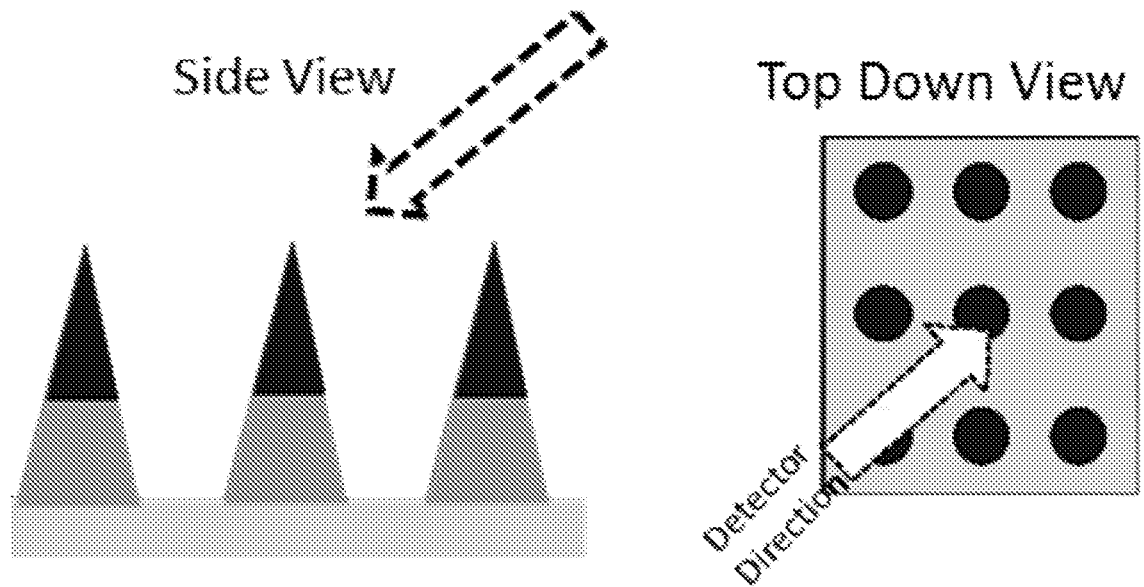
Fig. 2D
Fig. 2E
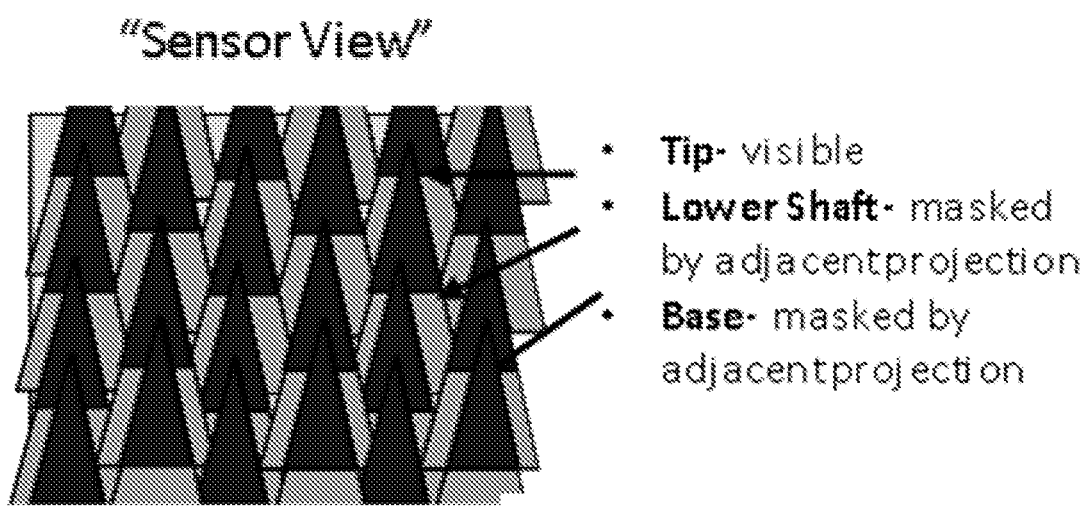
Fig. 2F

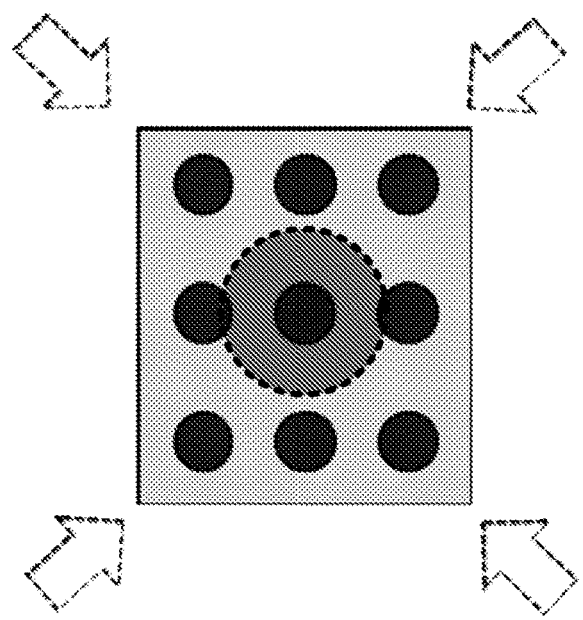
Fig. 3
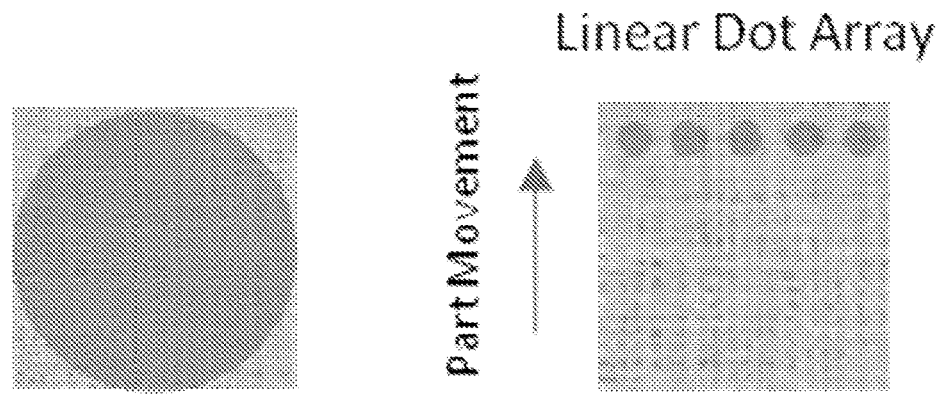
Fig. 4A Fig. 4B
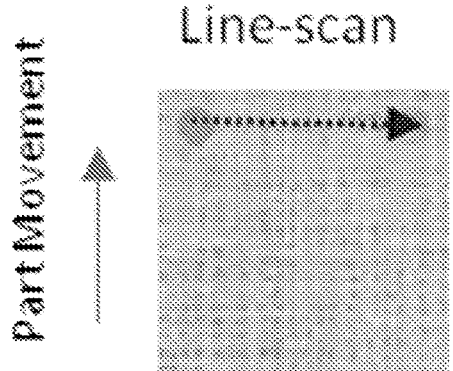
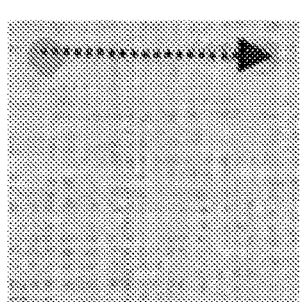
Fig. 4C Fig. 4D

- Excitation: 445 nm
- Emission Filter: 455-530 nm

Dried Vaccine reduces Polymer Fluorescence Signal

- Excitation: 405 nm
- Emission Filter: 495-515 nm

Dried Vaccine does NOT significantly reduce Polymer Fluorescence Signal

|  | Low Dose | | High Dose | |
| --- | --- | --- | --- | --- |
|  | Group 5 | Group 7 | Group 6 | Group 8 |
| Quantity Passing Membrane | 10 of 10 | 0 of 10 | 10 of 10 | 0 of 10 |
| Mean Reflectance (%) | 76.90 | 75.80 | 76.48 | 65.24 |
| Standard Deviation | 1.96 | 2.35 | 1.83 | 2.74 |
| Mean + (4xStDev) | 84.74 | 85.21 | 83.80 | 76.21 |
| Average (%) | 84.98 | | 80.00 | |
| Acceptance Threshold (%) | 85 | | 80 | |
| Probability of Result being > threshold | | | | |
| P (False Accept) | $1.8 \times 10^{-5}$ | $4.6 \times 10^{-5}$ | $2.7 \times 10^{-2}$ | $3.7 \times 10^{-8}$ |
| Parts/Batch (300) | 0.0 | 0.0 | 8.2 | 0.0 |
| Probability of Result being < threshold | | | | |
|  | Group 1 | | Group 2 | |
| P (False Reject) | $7.6 \times 10^{-7}$ | | $2.3 \times 10^{-3}$ | |
| Parts/Batch (300) | 0.0 | | 0.7 | |

Fig. 19

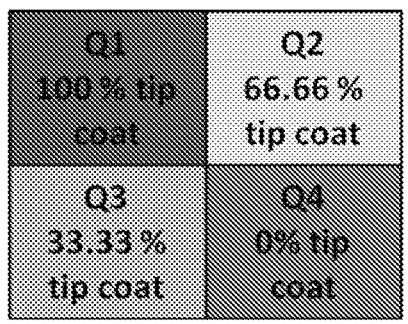

Fig. 20A

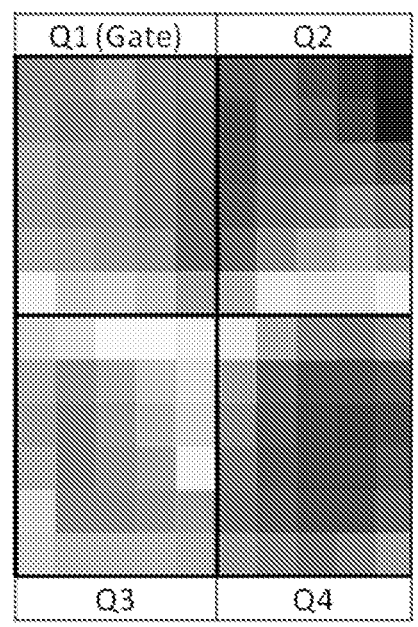

Fig. 20B

QUALITY CONTROL OF SUBSTRATE COATINGS

FIELD OF THE INVENTION

The present invention relates to devices and methods for detecting the amount of material coating a medical device or substrate, in particular the present invention relates to devices and methods for detecting the amount of vaccine material coating a microarray patch.

BACKGROUND OF THE INVENTION

Medical devices may be coated with any number of biocompatible materials. Therapeutic drugs, agents or compounds may be mixed with the biocompatible materials and affixed to at least a portion of the medical device. These therapeutic drugs, agents or compounds may be utilized to promote healing deliver drugs and provide pain relief. Various materials and coating methodologies may be utilized to maintain the drugs, agents or compounds on the medical device until delivered and positioned. Medical devices that may be coated with various compounds include stents, grafts, anastomotic devices, perivascular wraps, sutures, staples and microprojection arrays. Microprojection arrays or micro array patches (MAPS) are an effective way of delivering therapeutic agents or biomarkers to patients as the patches induce minimal or no pain, induce little or no injury from the microneedles and reduce the possibility of cross infection. The solid projections or needles on a patch can be coated with drugs or macromolecules. These can be subsequently delivered to a desired target by the penetration of the projections or needles into the skin. The microprojections can be coated by the therapeutic agents using a variety of techniques such as dip coating, spray coating, gas jet drying, electrodynamic atomization and ink jet printing.

Regardless of the methods used for coating the microprojections on the arrays it is useful to assess the amount of material coating the target delivery region of the microprojections which is often the upper ½ to ¼ of the microprojections. Several different techniques have been applied in an attempt to quantify the amount of material coated onto the microprojections. One technique provides for dissolving the coating and quantifying the active material by high-performance liquid chromatography (Ma, et al. J. Pharm Sci. 2014 103(11): 3621-3630. Other techniques to determine the loading of material onto microprojection arrays include determining the residual amount of material either on the microprojections after use or on the skin after the microprojection array has been removed. Fluorescence microscopy can detect fluorescent materials on the microprojections or in the skin after the microprojection array has been removed. Scanning electron microscopy can be used to take images of the microprojections before and after coating. These techniques usually require destruction of the coating and/or are cumbersome and slow. There exists a need to assess each microprojection array at high speed in an aseptic manufacturing environment to determine that the dose and position of the coated material, such as a vaccine, on the projections is correct. Preferably, the method for assessing the dose and position of the coated material would not destroy the coating in the process.

As the dried vaccine on the microprojections appears optically "clear", the use of standard imaging techniques to establish contrast between the coating and the polymer is not straightforward. Furthermore, it is desirable to determine if the upper portions of the microprojections are coated as this is the portion of the microprojection that enters the skin to deliver the material to the subject. Coating of the lower portions of the microprojections and/or the base upon which the microprojections rest is a waste of valuable biological material. The determination of the loading of the coating should be performed in an aseptic, non-destructive and rapid fashion.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavor to which this specification relates.

SUMMARY OF THE INVENTION

The present invention relates to devices and methods for detecting the amount of material coating a medical device or substrate. In particular, the devices and methods of the present invention are able to detect the amount of vaccine material coating a microarray patch. Uncoated substrate surfaces (e.g. polymers) may have different reflectance and/or a fluorescence emission spectrum from a coated substrate when the substrate is irradiated with a radiation source. Often, the reflectance or fluorescence signal is reduced when the substrate is coated versus the uncoated substrate.

The devices and methods of the present invention enable the use of electromagnetic radiation directed onto an uncoated/coated microprojection array or micro array patch (MAP) to be reflected off the array or to induce an electromagnetic emission and detected to determine the extent of coating of the microprojections on the microprojection arrays. The use of a laser (or other illumination source with appropriate illumination filters), and an intensity sensor (with appropriately chosen collection filters) to measure the reflected or emitted intensity of the electromagnetic radiation from a coated MAP correlates with coating performance or transfer efficiency of the coating onto the microprojections.

Inkjet coating is an emerging technology that can aseptically coat biologics onto MAP's. High speed reflectance measurement(s) allows a quantifiable value to ascertain whether the coating on the projection meets specification in terms of the mass of coated material and its position on the patch relative to base.

In one broad form, an aspect of the present invention seeks to provide a method for determining the amount (degree, extent) of coating on microprojections of a coated microprojection array, the method comprising: irradiating an uncoated microprojection array with an electromagnetic radiation source; measuring the reflected radiation from the uncoated microprojection array; irradiating an uncoated microprojection array with an electromagnetic radiation source; measuring the reflected radiation from the uncoated microprojection array; and determining the extent of coating on the microprojections by comparing the reflected radiation from the uncoated microprojection array to that of the coated microprojection array.

In one embodiment, the measuring of the reflected radiation from the uncoated microprojection array and the measuring of the reflected radiation from the coated microprojection array is done simultaneously.

In one embodiment, the measuring of the reflected radiation from the uncoated microprojection array and the measuring of the reflected radiation from the coated microprojection array is done sequentially.

In another broad form, an aspect of the present invention seeks to provide a method for determining the amount of coating on the microprojections of a coated microprojection array, the microprojection array comprising a base from which the microprojections project, the method comprising: irradiating the coated microprojection array with a light source; measuring the reflected radiation from the base of the coated microprojection array; and determining the amount of coating on the microprojections by comparing the reflected radiation from the coated microprojection array to that of an uncoated microprojection array.

In one embodiment, the reflected radiation is measured by a sensor.

In one embodiment, the number of sensors is four.

In one embodiment, the sensors are at approximately 45 degree downward angle to the microprojections and at 45 degrees out of alignment with the rows of microprojections.

In one embodiment, the electromagnetic radiation source is substantially perpendicular to the microprojection array.

In one embodiment, the electromagnetic radiation source is at an angle relative to the microprojection array.

In one embodiment, the electromagnetic radiation source is aligned over the microprojection array such that the angle relative to the microprojections is less than 5°.

In one embodiment, the electromagnetic radiation source is aligned over the microprojection array such that the angle relative to the microprojections is less than about 20°.

In one embodiment, the electromagnetic radiation source is aligned over the microprojection array such that the angle relative to the microprojections is less than about 45°.

In another broad form, an aspect of the present invention seeks to provide a device for measuring the coating on the microprojections on a microprojection array, the device comprising: an electromagnetic radiation source for illuminating the microprojection array; a microprojection array housing for mounting the microprojection array; and one or more sensors for detecting reflected radiation from the microprojection array.

In one embodiment, the radiation source is a laser diode.

In one embodiment, the radiation source is a laser diode which emits radiation from about 200 nm to 10000 nm.

In one embodiment, the radiation source is a laser diode which emits radiation at 635 nm.

In one embodiment, the sensor is a silicon photodiode.

In one embodiment, the silicon photodiode has a detection range of 200 to 1100 nm.

In one embodiment, the device is confined in an aseptic housing.

In one embodiment, the device further comprises a reference sensor.

In one embodiment, the number of sensors is four.

In one embodiment, the sensors are at approximately 45 degree downward angle to the microprojections and at 45 degrees out of alignment with the rows of microprojections.

In one embodiment, the electromagnetic radiation source is substantially perpendicular to the microprojection array.

In one embodiment, the electromagnetic radiation source is aligned over the microprojection array such that the angle relative to the microprojections is less than 5°.

In another broad form, an aspect of the present invention seeks to provide a device for measuring the coating on the microprojections on a microprojection array, the device comprising: a laser diode for illuminating the microprojection array; an aspheric lens; a beam shaping diffuser; a focusing lens wherein the aspheric lens is positioned between the laser diode and the beam shaping diffuser and the beam shaping diffuser is positioned between the aspheric lens and the focusing lens and the focusing lens is positioned between the beam shaping filter and the microprojection array housing; microprojection array housing for mounting a microprojection array; a bi-convex lens; a sensor for detecting reflected light from the microprojection array wherein the biconvex lens is positioned between the microprojection array housing and the receiver; and a power meter connected to the sensor.

In one embodiment, the device further comprises a microarray mounting station.

In one embodiment, the device further comprises one or more microarrays.

In one embodiment, the laser diode emits electromagnetic radiation at bout 635 nm.

In one embodiment, the device further comprises an aperture positioned between the focusing lens and the microprojection array housing.

In one embodiment, the device further comprises a mirror positioned between the aperture and the microprojection array housing In one embodiment, the device further comprises a reference sensor.

In one embodiment, the number of sensors is four.

In one embodiment, the sensors are at approximately 45 degree downward angle to the microprojections and at 45 degrees out of alignment with the rows of microprojections.

In one embodiment, the laser diode is substantially perpendicular to the microprojection array.

In one embodiment, the laser diode is aligned over the microprojection array such that the angle relative to the microprojections is less than 5°.

In another broad form, an aspect of the present invention seeks to provide a method for determining the extent (degree, amount) of coating on microprojections of a coated microprojection array comprising: irradiating an uncoated microprojection array with an electromagnetic radiation source; measuring the emitted radiation from the uncoated microprojection array; irradiating a coated microprojection array with a light source; measuring the emitted radiation from the coated microprojection array; and determining the extent of coating on the microprojections by comparing the emitted radiation from the uncoated microprojection array to that of the coated microprojection array.

In one embodiment, the emitted radiation is fluorescence.

In one embodiment, the electromagnetic radiation source emits at approximately 445 nm.

In one embodiment, the fluorescence is detected by a sensor with a filter having a bandpass of between about 455 nm to 515 nm.

In another broad form, an aspect of the present invention seeks to provide a method for determining the extent (degree, amount) of coating on a substrate comprising: irradiating an uncoated microprojection array with a first electromagnetic radiation source which reflects off the substrate and a second electromagnetic radiation source which promotes fluorescence in either the substrate or the coating or both; measuring the reflected radiation from the uncoated microprojection array; measuring the emitted fluorescence radiation from the uncoated microprojection array; irradiating a coated microprojection array with a first electromagnetic radiation source which reflects off the substrate and a second electromagnetic radiation source which promotes fluorescence in either the substrate or the coating or both irradiating a coated microprojection array with a light source; measuring the reflected radiation from the coated microprojection array; measuring the emitted fluorescence radiation from the coated microprojection array; and determining the extent of coating on the microprojections by comparing the reflected radiation from the uncoated microprojection array to that of the coated microprojection array and by comparing the reflected radiation from the uncoated microprojection array to that of the coated microprojection array.

In another broad form, an aspect of the present invention seeks to provide a method for controlling the quality of coated microprojection arrays, the method including: determining the amount (degree, extent) of coating on microprojections of a coated microprojection array using the method as described above; comparing the determined amount of coating to a coating specification; and rejecting the coated microprojection array if the determined amount of coating is outside of the coating specification.

In another broad form, an aspect of the present invention seeks to provide a system for controlling the quality of coated microprojection arrays, the system including a device as described above that determines the amount of coating on microprojections of a coated microprojection array; and a processing system configured to: receive, from the device, an indication of the determined amount of coating; compare the determined amount of coating to a coating specification; and determine that the coated microprojection array should be rejected if the determined amount of coating is outside of the coating specification.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various examples and embodiments of the present invention will now be described with reference to the accompanying drawings, in which:

FIG. 2D is a schematic diagram of a side view of the microprojection array and the relative position of the detector at a 45 degree angle to the microprojection array; FIG. 2E is a schematic diagram of an overhead view of the detector direction relative to the microprojection array and the direction of the detector for detecting reflectance; FIG. 2F is the image the detector would see given the orientation of the detector in accordance with FIGS. 2D and 2E; FIG. 3 is a schematic diagram of an overhead view of a microprojection array where the radiation illumination is from the top with little or no angle and the use of four detectors at approximately 45 degree downward angle and at 45 degrees out of alignment with the rows of microprojections.

FIGS. 4A-4D are schematic diagrams of an illumination scheme respectively, large spot reflectance, linear dot array, line scan array and two dimensional array.

FIG. 6A is the spectra obtained from the polymer without dried vaccine. FIGS. 6B and 6C are data from different regions within the dried vaccine drop (edge of dried drop, and center of dried drop). Spectral features in the wavenumber range from 1300 cm-1 to 1900 cm-1 are highlighted that seem to correlate with the presence of dried vaccine.

FIG. 19 is a table of laser acceptance criteria for low dose and high dose amounts.

FIG. 20A is a schematic of the coating percentages by quadrant for a microprojection array; FIG. 20B is a "heat map" representation of reflectance vs position data of the coating of the microprojection array. Green color represents a high intensity (i.e. Significant tip coating) and red color is mapped to low intensity readings (i.e. With significant base coating).

DETAILED DESCRIPTION OF THE INVENTION

Figure 1A:
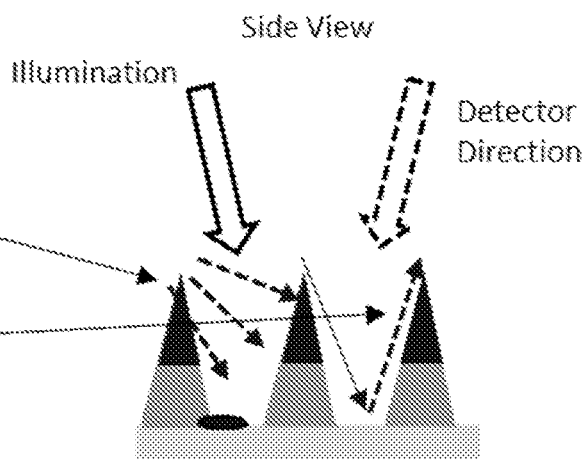
FIG. 1A is a schematic diagram of a side view of the microprojection array and the relative position of the detector and illumination source relative to the microprojection array.
Figure 1B:
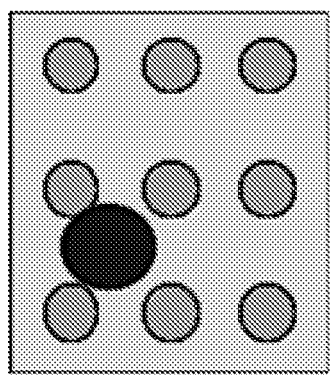
FIG. 1B is the image the detector would see given the orientation of the detector in accordance with FIG. 1A.
Figure 2A:
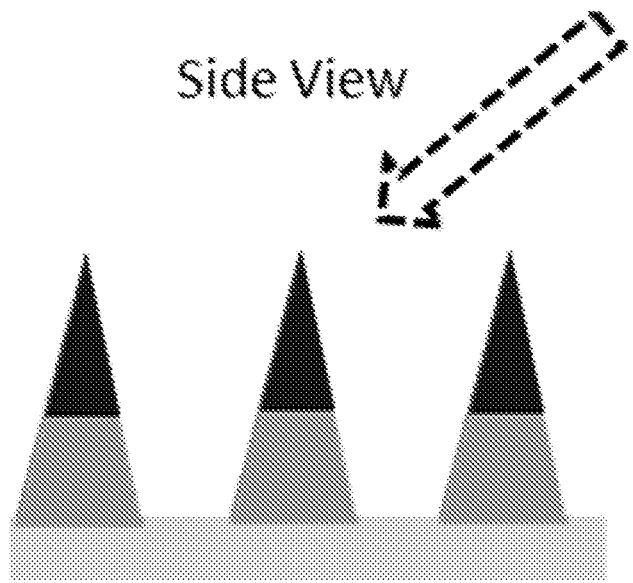
FIG. 2A is a schematic diagram of a side view of the microprojection array and the relative position of the detector at a 45 degree angle to the microprojection array.
Figure 2B:
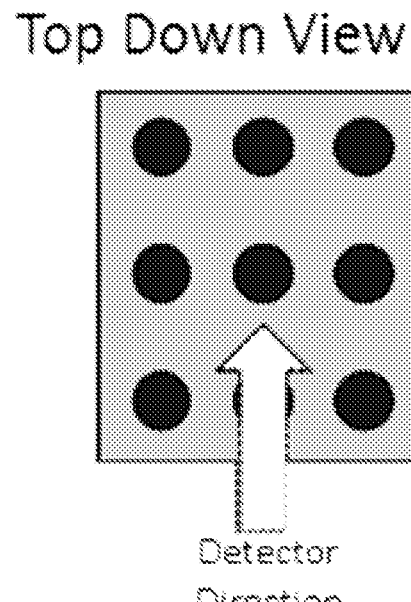
FIG. 2B is a schematic diagram of an overhead view of the detector direction relative to the microprojection array and the direction of the detector for detecting reflectance.
Figure 2C:
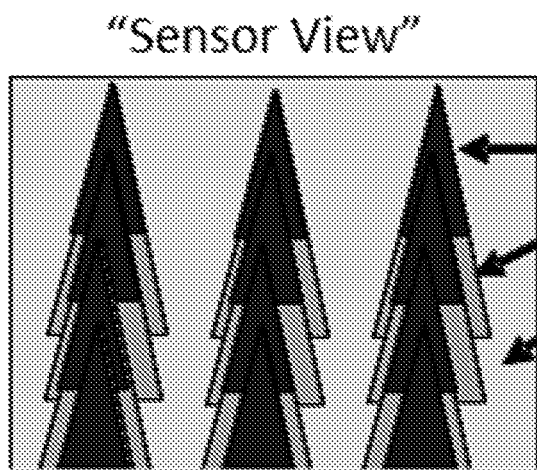
FIG. 2C is the image the detector would see given the orientation of the detector in accordance with FIGS. 2A and 2B.

The present invention relates to devices and methods for detecting the amount of material coating a medical device or substrate, in particular the present invention relates to devices and methods for detecting the amount of vaccine material coating a microarray patch in real time.

The patches take a variety of forms from metal formed patches to polymer molded patches to patch projections formed from the vaccine or pharmacological solution itself. The manufacture of these patches relies on the ability to deposit a dried down drug solution or vaccine onto the tips of the microprojections with high throughput and high accuracy. Accurately coating the projections is important as the delivery of the coated material to the patient needs to be consistent. If too little material is delivered the efficacy of the treatment is compromised. Too much material could lead to overdosing or at a minimum wasting expensive vaccine or drug. The ability to coat the patches quickly is necessary to producing a commercial product. Coating of a Micro Array Patch (MAP) and other vaccine and biologic platforms requires the precise dosing and allocation of biologics targeting each individual projection on the platform with a controlled dose. Typically, a MAP (Micro Array Patch) platform has a length and a width of less than 20 mm and carries an evenly spaced two-dimensional array of projections. The microprojections are situated on a substantially planar base. The number of projections in either dimension may be less than 100. Therefore the projection density on the MAP is usually between 2,000 and 10,000 per $cm^2$. The total amount of pharmaceutical formulation such as a vaccine required to coat each projection is typically more than 500 picolitres and must be accurately measured both in terms of the applied dried volume of material and the position of the material on the microprojection. For example it would be informative to determine whether the material deposited on the microprojections was located on the top fourth of the microprojection or top half of the microprojection or whether the entire microprojection was coated. Furthermore, in order to accomplish large volume manufacturing of MAPs, each patch may need to be coated with one or more drops (e.g. 1-6 drops per microprojection or between 20 pl to 1 µL of material) in in a short time period (e.g. seconds). It is important to be able to quantify the amount of material that is distributed onto the microprojections in a manner that is preferably non-destructive and which does not contact the material or the microprojections. The method should be rapid enough to keep up with production levels of microprojection arrays which could number in the millions per week. The devices and methods of the present invention provide the ability to determine the amount of material coated onto the microprojections of the MAP.

The devices and methods of the present invention can determine the amount of material deposited on a substrate where the substrate is made of both an area that is nominally "to be coated" and an area that is nominally "uncoated". The measurement of the coating distribution can in principle be made by the direct measurement of the material on the coated area of substrate or inferred by the measurement of the absence of material in the nominally uncoated area of the substrate. For example with respect to microprojection arrays which are made of a base from which microprojections arise, the coated area is the tips of the microprojections (preferably the top half of the microprojections) and the uncoated area is the base from which the microprojections arise (preferably the lower 50% of the projection). Thus the measurement of the material on the microprojections can be made either directly by determining the amount of material on the microprojections or by the measurement of material on the base from which the amount of material on the microprojections can be determined. The devices and methods of the present invention enable the use of electromagnetic radiation directed onto an uncoated/coated microprojection array or micro array patch (MAP) to be reflected off the array or to induce an electromagnetic emission and detected to determine the extent of coating of the microprojections on the microprojection arrays. In the devices and methods of the present invention the detection of the coating on the MAP may utilize one or more electromagnetic radiation wavelengths for reflectance measurements or fluorescence detection. The devices and methods of the present invention may use reflectance measurements and fluorescence measurements alone or in combination either simultaneously or sequentially. Optics may be required for reflectance mode measurements to make sure illumination is collimated. Fluorescence mode illumination may not require collimated light.

The use of a laser (or other illumination source with appropriate illumination filters), and an intensity sensor (with appropriately chosen collection filters) to measure the reflected or emitted intensity of the electromagnetic radiation from a coated MAP correlates with coating performance or transfer efficiency of the coating onto the microprojections. The sensor may ideally have optics for both reflectance and fluorescence mode measurements in order to maximize signal collection and directionality of photons.

In the devices and the methods of the present invention the uncoated surfaces of the MAP (e.g. a polymer microprojection array patch) have different reflectance and/or fluorescence emission spectra from a polymer surface that is coated; the orientation of the sensor relative to the substrate surface being measured can assist in isolating signals that are primarily related to coating on either the base region, or the tip region (depending on the sensor configuration); coating on a surface is detected as a reduction in the signal intensity compared to the signal from a reference surface; the reference surface can be an uncoated patch or a measurement made at a wavelength where the coating is substantially transparent, and is thus representative of an uncoated patch. For example, in a reflectance configuration for measuring a signal related to the amount of base coating the illumination source and sensor may be positioned such that if the patch were replaced by a mirror, the beam would reflect off the mirror and enter directly in alignment with the sensor optics detection path. When the mirror is replaced with a microprojection patch, the illumination will, like the mirror, substantially reflect off of the base region of the patch. Regions of the patch, where there are microprojections, will not contribute a significant signal in the direction of the sensor since the microprojections are substantially orthogonal to the base of the patch. Therefore, the measured signal is primarily from the reflection of the electromagnetic radiation from the base. However, if a material such as a vaccine is present on the base, the material will act to reduce the reflected signal (either from absorption by the material or by scattering). If the quantity of material deposited onto the patch is known and controlled, the amount of coating on the tips can then be inferred from the measured quantity on the base. In the case where material is substantially deposited on the tips with little material deposited on the base, the measured reflectance intensity signal will be high (ostensibly the same or similar as an uncoated patch). If material is instead deposited on the base, the reflected intensity will be reduced. Thus, if a high proportion of tip is coated the result will be the detector will observe a large signal, whereas a low proportion of tip coating will result in a small signal.

In one embodiment of the devices of the present invention the device is comprised of a radiation (light) source, a coated microprojection array and a sensor for detecting radiation (light). The radiation source illuminates the coated array and the sensor is positioned such that it can detect the radiation reflected from the coated array. To determine the amount of coating on the microprojection array the value of reflected light derived from the sensor may be compared to the value of reflected light derived from the sensor when the same radiation source is reflected off an uncoated microprojection array. A normalized reflectance diagram can be constructed (See FIG. 13) which correlates the normalized reflectance of the radiation with the transfer efficiency of the coating onto the microprojections. Example 1 provides the details of the construction of the normalized reflectance diagram, but in essence several different coating amounts may be applied to several different microprojection arrays such that different transfer efficiency of the coating is achieved. The transfer can be measured in a variety of ways including a membrane transfer method in which the material transferred to the membrane from the microprojections was quantified by using scintillation counting of 14 C or Ponseau S staining. While the initial transfer efficiency measurement may be made in a destructive fashion the measurements may be made with methods which are non-destructive. These different microprojection arrays can then be subjected to irradiation by the radiation source and the reflected radiation measured by the sensor. An uncoated microprojection array can then be tested and the normalized reflectance can be calculated by dividing the reflectance values obtained in the various coated microprojection array by the reflectance value obtained from the uncoated array. If all of the coating material is transferred to the microprojections then none of the material will be on the base of the array. Thus, the reflectance value of an array where none of the material is transferred to the base is the same as that of the uncoated array. Reflectance values of the coated array which are less that the reflectance values of the uncoated arrays indicate that some of the coating material was transferred to the microprojections. Once the correlation of the normalized reflectance and the transfer efficiency is established then the measurement of the transfer efficiency of any coated microprojection array can be ascertained. The transfer efficiency of the coated microprojection array can be determined in a non-destructive, real-time fashion.

As described above the reflectance from the coated patch may be compared to the reflectance from the uncoated patch. This comparison could be accomplished by having an uncoated and coated patch illuminated simultaneously or sequentially. The comparison could also be accomplished by comparing a portion of a single patch which contains both coated and uncoated sections.

In addition to the basic scheme described above other optical equipment and/or mechanical equipment may also be included in the devices and methods of the present invention. Various lenses, filters and mirrors to optimize the illumination of the patch as well as providing optimal conditions for detection of the reflected light may be provided. A housing that provides aseptic or sterile conditions for the microarray can also be part of the devices of the present invention. It is desirable to maintain an aseptic or sterile environment so that the microarrays are not contaminated as the coatings on the microprojections are to be inserted into patients.

In the devices and methods of the present invention various radiation sources may be used including but not limited to laser sources, infrared sources and fluorescence sources. In some embodiments of the devices and methods of the present invention the wavelength of the radiation source may be at a wavelength or wavelengths at which the coating strongly absorbs. In other embodiments, the dried coating material may either strongly emit fluorescence in response to the excitation wavelength, or strongly absorb or scatter at the emitted fluorescence wavelength of the underlying polymer substrate. The direction of the illumination source and the detector patch may influence the quality and information received, especially for detection based on reflectance. the orientation of the sensor relative to the microprojection array surface being measured can assist in isolating signals that are primarily related to coating on either the base region, or the tip region (depending on the sensor configuration). Illuminating near normal to patch surface results in a signal that is almost entirely due to the base reflectance (reflections from projections do not return to the sensor). Reflectance is reduced when coating is present, due to either absorbance by the coating, or scattering from the dried solids deposits. Placing the sensor at an angle such that tips of other projections in the array mask or shadow the base portion of the projections as well as the base of the patch coating on a surface is detected as a reduction (or increase in some cases) in the signal intensity compared to the signal from a reference surface. Illumination should be electromagnetic radiation source with a defined wavelength (or wavelengths if 2 or more are needed)

The orientation of the electromagnetic radiation source and the sensors influence the reflectance signal that registers with the detectors. For example, if the detector and illumination source are oriented as in FIG. 1A, the tips of the microprojections are visible, but they contribute little reflectance signal because the light from the tips is not directed towards the sensor. The reflectance signal intensity is related to the light reflected from the base and if the coating material is coating the base rather than the tips of the microprojections the signal is reduced. FIG. 1B shows the view that a sensor placed in the orientation in FIG. 1A would "see". For example, FIG. 2C shows the view the detector "sees" if the detector is placed in the direction as shown in FIG. 2B and at the angle as shown in FIG. 2A. The tip of the microprojection is visible while the body of each microprojection is masked by the adjacent microprojections. However in this case, the base is also visible between the rows of microprojections. Thus the signal received will be a combination of signals emanating from the base and the top half of each projection. FIG. 2F shows the view the detector "sees" if the detector is placed in the direction as shown in FIG. 2A and the angle as shown in FIG. 2E. In this case, the tip of the microprojection is visible and the body of each microprojection is masked by the adjacent microprojections. Importantly, the base is also masked by adjacent microprojections. The received signal comes primarily from the projection tips, but only from the side of the projection facing the detector. In order to maximize information collection from the entire tip surface, an alternate configuration may be used as in FIG. 3, where the illumination is such that the use of four detectors at approximately 45 degree downward angle to the microprojections and at 45 degrees out of alignment with the rows of microprojections provides a signal primarily from the tips of the microprojection arrays. The use of this geometric masking by having the detector detect signals from the upper coated portion of the microprojection rather than from the lower uncoated portion of the microprojection and uncoated base can isolate the signal from the coated portion of the microprojection.

The size of the area illuminating the substrate, such as a microprojection array will also influence the quality of the data. For example if the area of illumination is a large area relative to the entirety of the substrate the information gathered from the reflectance data will relate to an average coating over the entire substrate. Smaller areas of illumination relative to the entirety of the substrate will provide more data about the coating of particular areas of the substrate. The smaller the area of illumination the greater the detail of the coating on the substrate. For example more detail will be gained by illuminating a single microprojection than illuminating the entire microprojection array. FIG. 4 shows various configurations of illuminating a microprojection array. With respect to illumination of a microprojection array the diameter of the illuminating spot can be as large as the diameter of the entire array or as small as an individual microprojection. In some embodiments the diameter of the illumination spot may be 10 mm or less or 9 mm or less or 8 mm or less or 7 mm or less or 6 mm or less or 5 mm or less or 4 mm or less or 3 mm or less or 2 mm or less or 1 mm or less or 0.5 mm or less or 0.1 mm or less or 0.05 mm or less or 0.01 mm or less.

Figure 5A:
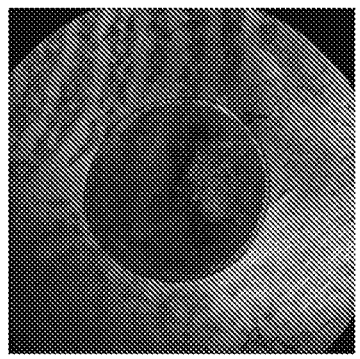
FIG. 5A is a fluorescence image of dried vaccine on a flat polymer disc, to demonstrate the principle of fluorescence reduction. The excitation wavelength is set at 445 nm and the emission filter is 455-530 nm. The polymer surface fluoresces when excited with 445 nm light, and the dried vaccine reduces the measured intensity.
Figure 5B:
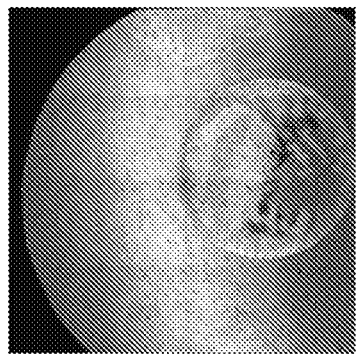
FIG. 5B is a photograph of a polymer microprojection array coated with dried vaccine where the excitation wavelength is set at 405 nm and the emission filter is 495-515 nm. In this scenario, the dried vaccine does not appear to significantly reduce the fluorescence intensity of the underlying polymer. These conditions could potentially serve as a reference measurement that would be similar to an uncoated patch.

Alternatively the use of fluorescence rather than reflectance may decrease the dependence of the signal on the geometry of the radiation source and the detectors as fluorescence emits in all directions. In the case of reflectance the signal may be reduced by as much as 95% if the source of the radiation is normal to the patch. Conversely, if the source of radiation is normal to the patch when using fluorescence detection, the signal is only marginally reduced. If a coating is coated onto a substrate such as on the microprojections of a microprojection array the wavelength for excitation and the wavelength range for an emission filter can provide scenarios where the coating such as a vaccine may either mask the fluorescence of the patch (polymer) or provide little or no masking of the fluorescence of the patch (polymer). For example, in FIG. 5A, the excitation wavelength is set at 445 nm and the emission filter is 455-530 nm. In this case the vaccine coating on the polymer patch masks the fluorescence signal from the polymer thereby reducing the signal. In FIG. 5B, the excitation wavelength is set at 405 nm and the emission filter is 495-515 nm. In this case the vaccine coating on the polymer patch does not mask the fluorescence signal from the polymer and only reduces the signal marginally. This signal could thus potentially serve as a reference signal on a coated patch which might enhance the quality of the measurement and/or remove the need to measure the patch before it is coated.

Figure 6A:
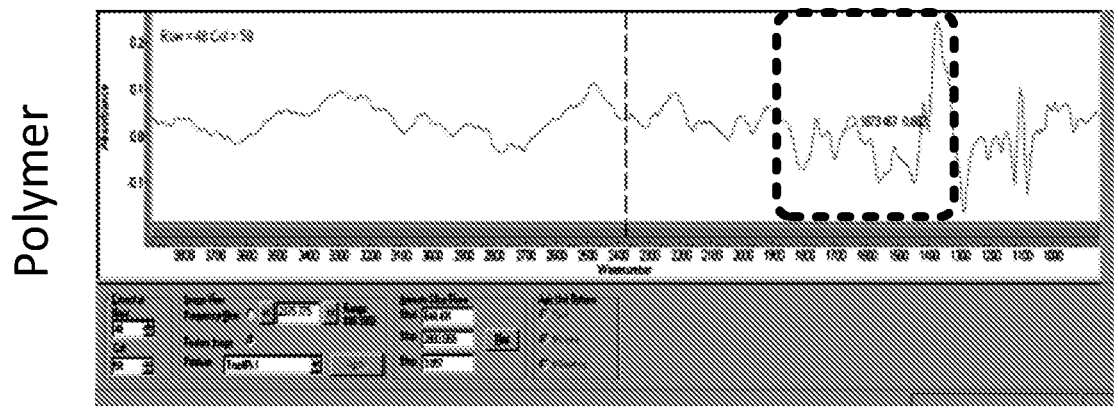
FIG. 6A-6C present data from FTIR scans of flat polymer discs with dried vaccine for the purpose of potentially identifying useful spectral features.
Figure 6B:
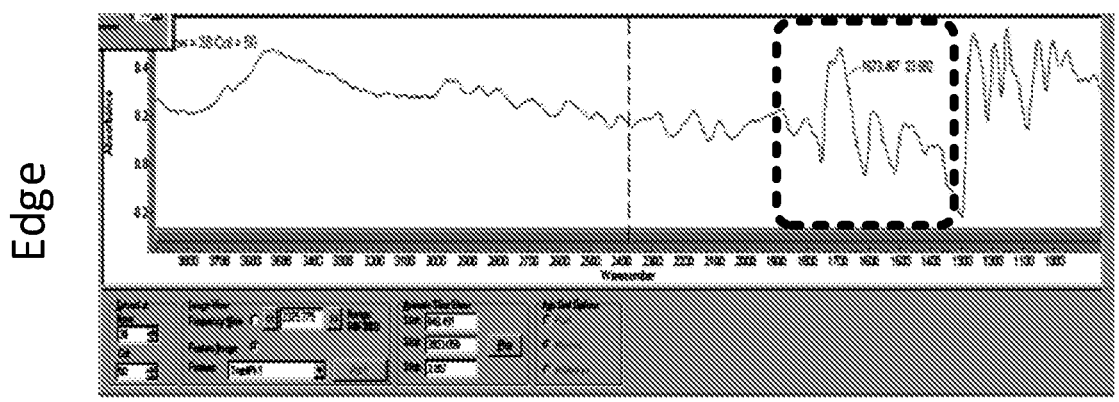
Figure 6C:
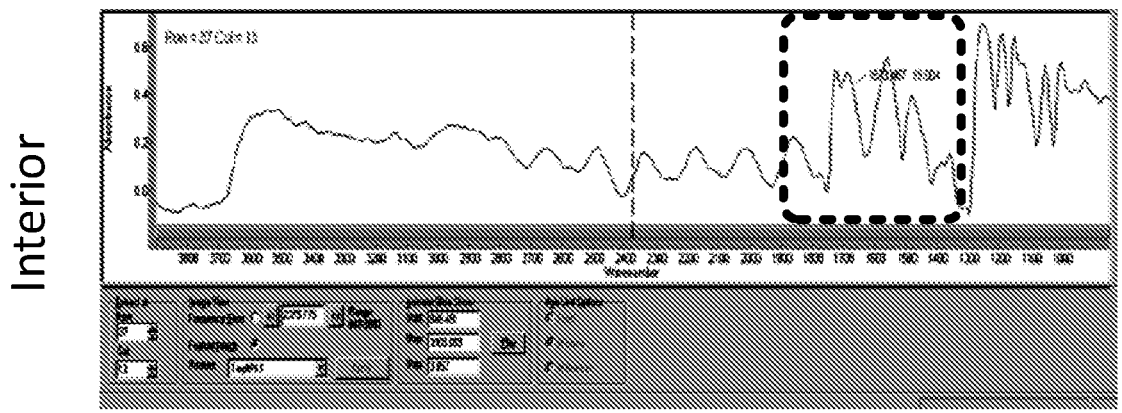

The use of Fourier Transform Infrared Spectroscopy (FTIR) may be used to assist in identifying optimal wavelengths for detection of the coating on a substrate. To achieve maximum sensitivity, it may be desirable to select a wavelength where the dried vaccine absorbs strongly compared to the polymer (See FIG. 6). FTIR Spectral Imaging may assist in identifying strong absorbance peaks that are unique to the dried vaccine.

Figure 7:
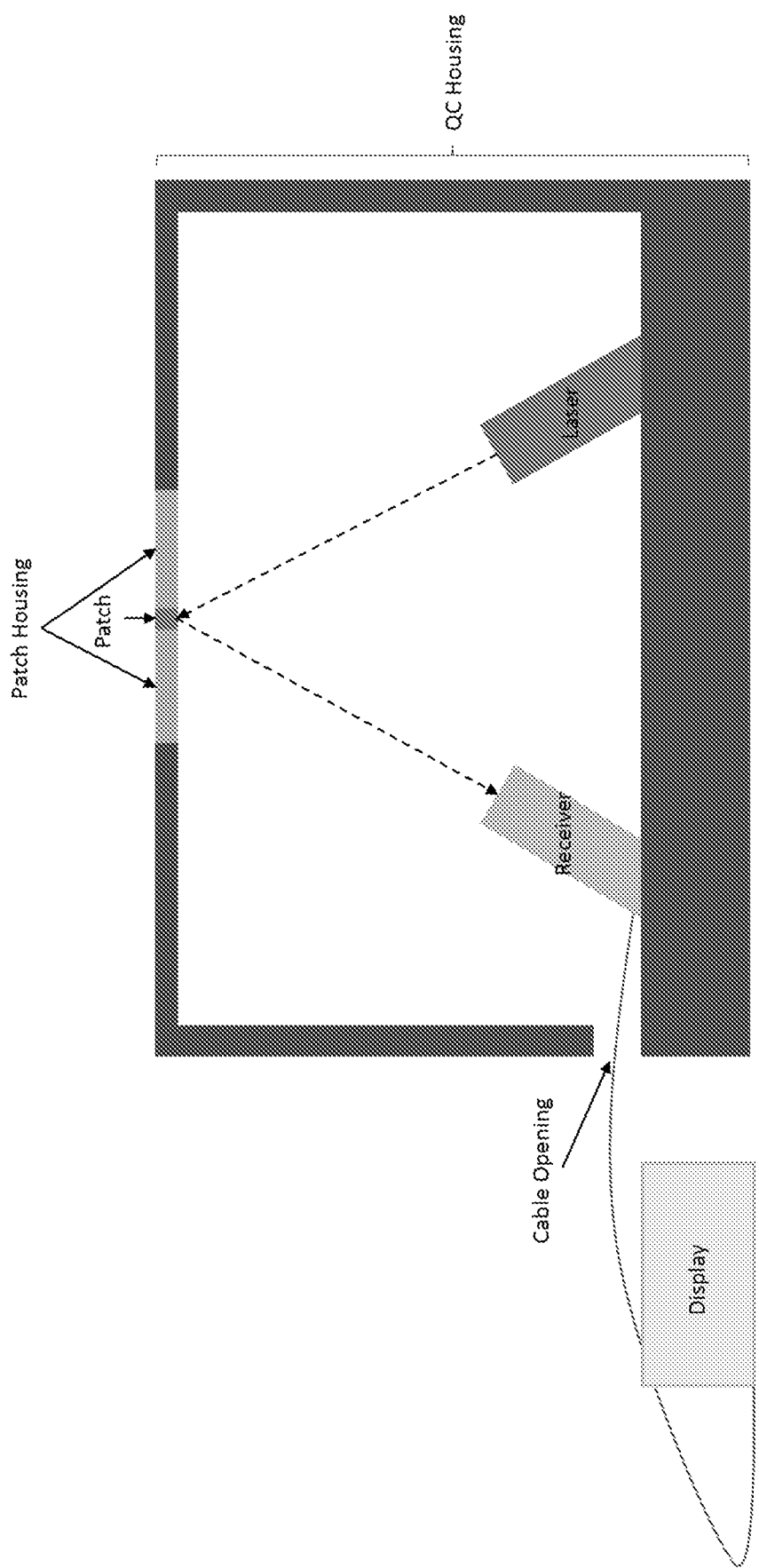
FIG. 7 is a schematic diagram of one embodiment of the equipment setup for reflectance detection of a coating on a substrate

FIG. 7 is a schematic diagram of a device for measuring reflectance in which radiation is projected onto the patch and a receiver detects the reflected light which is communicated to a display device. The radiation source can be any source that emits radiation. Laser diodes are preferred as the radiation source as they have high intensity, narrow bandwidth, and are collimated, which simplifies the optical setup. In one embodiment the laser diode may be a 4.5 mW laser diode that emits light at 635 nm and has adjustable focus. The laser may be powered by a power supply such as a 5 VDC power supply. A large range of wavelengths may be used in the methods and the devices of the present invention. A wavelength between 200 nm to 10 µm may be used for illuminating the microprojection array. Wavelengths between 200 nm to 10000 nm or between 200 nm to 9000 nm or between 200 nm to 8000 nm or between 200 nm to 7000 nm or between 200 nm to 6000 nm or between 200 nm to 5000 nm or between 200 nm to 4000 nm or between 200 nm to 3000 nm or between 200 nm to 2000 nm or between 200 nm to 1000 nm or between 200 nm to 900 nm or between 200 nm to 800 nm or between 200 nm to 700 nm or between 200 nm to 600 nm or between 200 nm to 500 nm or between 200 nm to 400 nm or between 200 nm to 300 nm or between 300 nm to 10000 nm or between 300 nm to 9000 nm or between 300 nm to 8000 nm or between 300 nm to 7000 nm or between 300 nm to 6000 nm or between 300 nm to 5000 nm or between 300 nm to 4000 nm or between 300 nm to 3000 nm or between 300 nm to 2000 nm or between 300 nm to 1000 nm or between 300 nm to 900 nm or between 300 nm to 800 nm or between 300 nm to 700 nm or between 300 nm to 600 nm or between 300 nm to 500 nm or between 300 nm to 400 nm or between 400 nm to 10000 nm or between 400 nm to 9000 nm or between 400 nm to 8000 nm or between 400 nm to 7000 nm or between 400 nm to 6000 nm or between 400 nm to 5000 nm or between 400 nm to 4000 nm or between 400 nm to 3000 nm or between 400 nm to 2000 nm or between 400 nm to 1000 nm or between 400 nm to 900 nm or between 400 nm to 800 nm or between 400 nm to 700 nm or between 400 nm to 600 nm or between 400 nm to 500 nm or between 300 nm to 400 nm or between 500 nm to 10000 nm or between 500 nm to 9000 nm or between 500 nm to 8000 nm or between 500 nm to 7000 nm or between 500 nm to 6000 nm or between 500 nm to 5000 nm or between 500 nm to 4000 nm or between 500 nm to 3000 nm or between 500 nm to 2000 nm or between 500 nm to 1000 nm or between 500 nm to 900 nm or between 500 nm to 800 nm or between 500 nm to 700 nm or between 500 nm to 600 nm or between 600 nm to 10000 nm or between 600 nm to 9000 nm or between 600 nm to 8000 nm or between 600 nm to 7000 nm or between 600 nm to 6000 nm or between 600 nm to 5000 nm or between 600 nm to 4000 nm or between 600 nm to 3000 nm or between 600 nm to 2000 nm or between 600 nm to 1000 nm or between 600 nm to 900 nm or between 600 nm to 800 nm or between 700 nm to 10000 nm or between 700 nm to 9000 nm or between 700 nm to 8000 nm or between 700 nm to 7000 nm or between 700 nm to 6000 nm or between 700 nm to 5000 nm or between 700 nm to 4000 nm or between 700 nm to 3000 nm or between 700 nm to 2000 nm or between 700 nm to 1000 nm or between 700 nm to 900 nm or between 700 nm to 800 nm. In certain embodiments the radiation sources used in the devices and methods of the present invention, 635 nm was utilized primarily to reduce the effect of background light (noise) from the room. At 635 nm the intensity of room lighting at this wavelength is very low compared to the laser intensity. Filters may be placed in front of the sensor to significantly remove the other wavelengths of light (primarily from room lighting) from striking the sensor. In certain embodiments the measured signal from the room lights was not detectable by the sensor which measures into the 100 picoWatt range (1010 Watts). The signals from the laser are usually in the microwatt range (106), meaning that the signal detected by the sensor is about 1,000 to 10,000 times more intense than the background radiation.

The sensor can be a detector such as a photodiode including but not limited to silicon photodiodes preferably with a wavelength range 400-1100 nm, power range 500 pW-500 mW and coated with an ND reflective coating. Placing a filter in front of the sensor can be used to reduce stray signals from light coming from the production environment. A filter can filter out the excitation wavelength when a fluorescence signal is being measured. Additionally, optical elements placed in front of the sensor may assist is maximizing the specificity in directionality and signal amplitude. The sensor can be directly read by a power meter console which is compatible with the receiver or a PLC system which reads the power sensor measurements, processes them, and feeds the information into the production system.

Figure 8B:
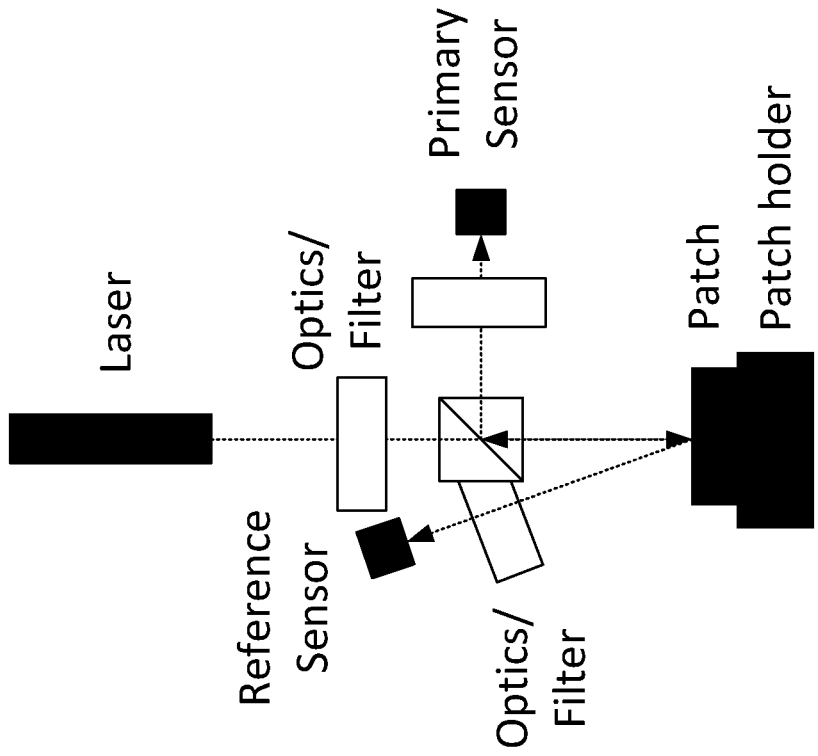
FIG. 8B is a drawing of an alternate embodiment of the equipment setup for detecting the coating.
Figure 8A:
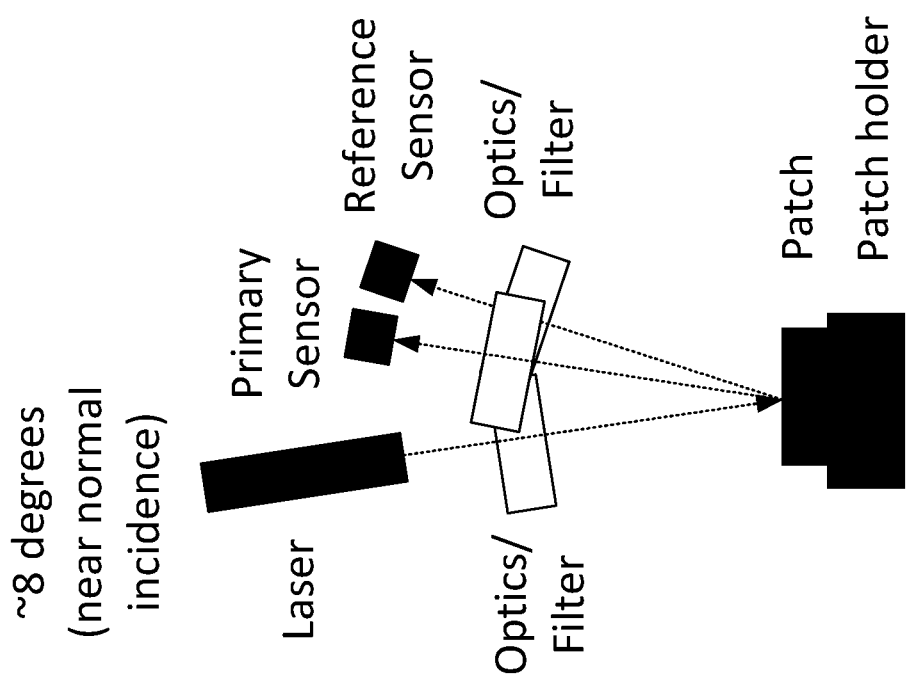
FIG. 8A is a drawing of one embodiment of the equipment setup for detecting the coating on a coated substrate.
Figure 9:
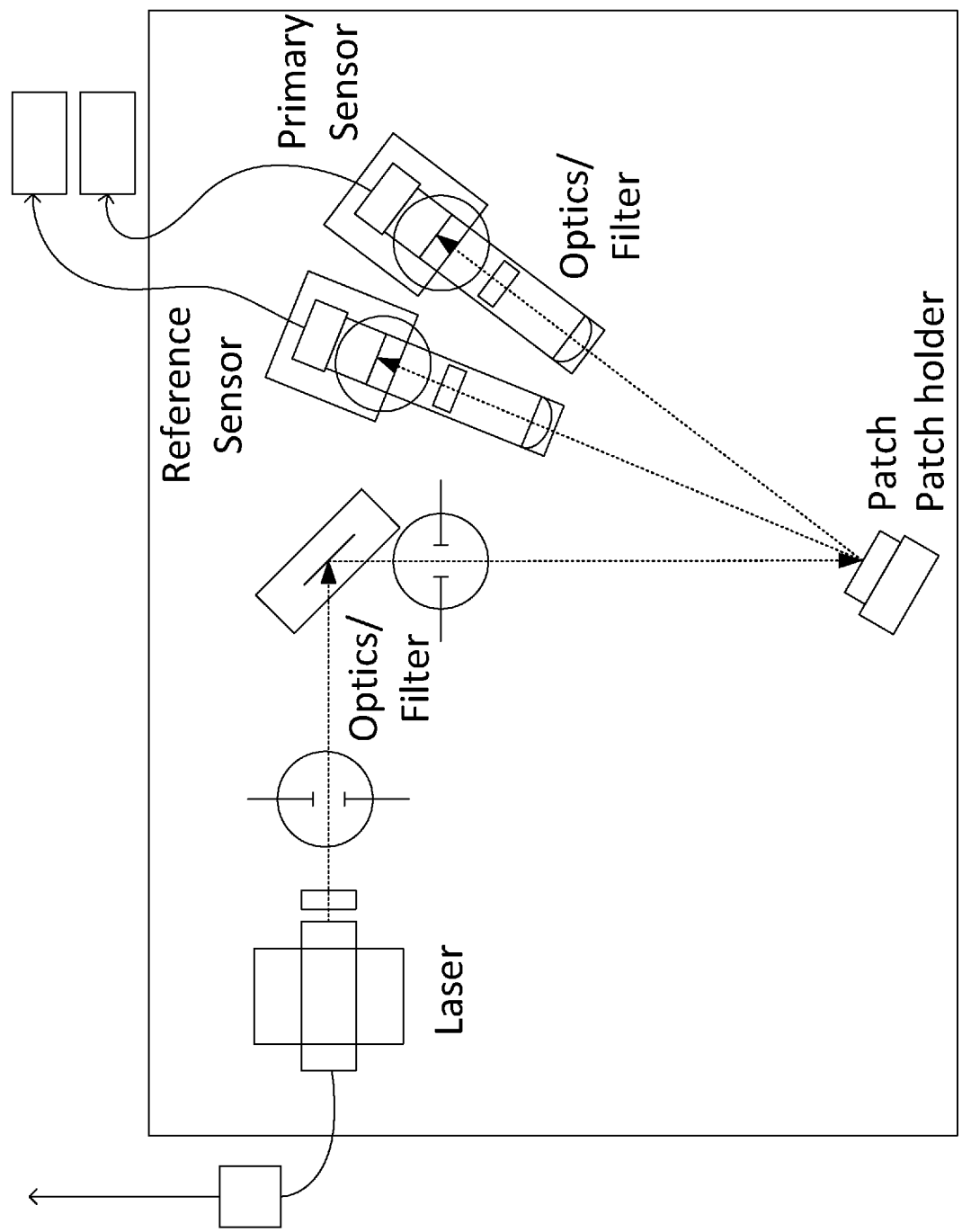
FIG. 9 is a schematic diagram of one embodiment of the equipment setup for detecting the coating on a coated substrate.

FIGS. 8A and 8B and FIG. 9 are schematic diagrams of alternative embodiments of the present invention that include the components in FIG. 7 but in addition may provide various lenses, filters and mirrors to optimize the illumination of the patch as well as providing optimal conditions for detection of the reflected light. In general lenses can be convex/convex lenses with 350-700 nm wavelength. The lenses are typically uncoated. Bi-convex lenses are useful for many finite imaging applications. This type of lens is best suited for use in situations where the object and image are on opposite sides of the lens and the ratio of the image and object distances (conjugate ratio) is between 0.2 and 5. Filters include bandpass filters which provide one of the simplest ways to transmit a well-defined wavelength band of light, while rejecting other unwanted radiation. Their design is essentially that of a thin film Fabry-Perot Interferometer formed by vacuum deposition techniques and consists of two reflecting stacks, separated by an even-order spacer layer. These reflecting stacks are constructed from alternating layers of high and low refractive index materials, which can have a reflectance in excess of 99.99%. By varying the thickness of the spacer layer and/or the number of reflecting layers, the central wavelength and bandwidth of the filter can be altered. In one particular embodiment the filter permits transmission of 635±2 nm. The design also may include the use of mirrors such as broadband dielectric mirror 400-750 nm.

Figure 10:
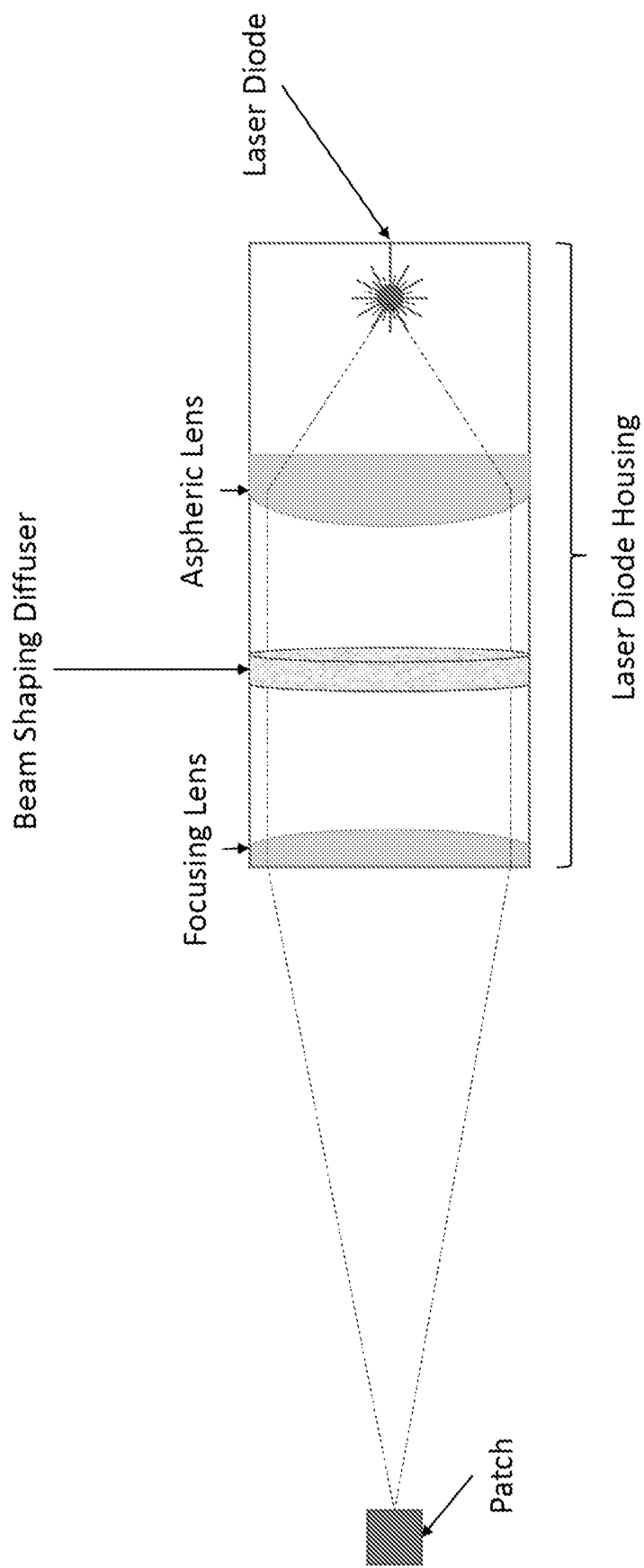
FIG. 10 is a schematic diagram of one embodiment of the laser diode housing.

FIG. 10 is a schematic diagram of one embodiment of the laser diode housing of the devices and methods of the present invention. The design of the laser diode housing includes a laser diode housing, laser diode, an aspheric lens, a beam shaping diffuser and a focusing lens. The aspheric lens will cause the beam coming from the laser diode to diverge and the beam shaping diffuser will shape the beam. After passing through the beam shaping diffuser the focusing lens will focus the shaped beam onto the patch. Optionally a diaphragm may be placed between the focusing lens and the patch.

Figure 11:
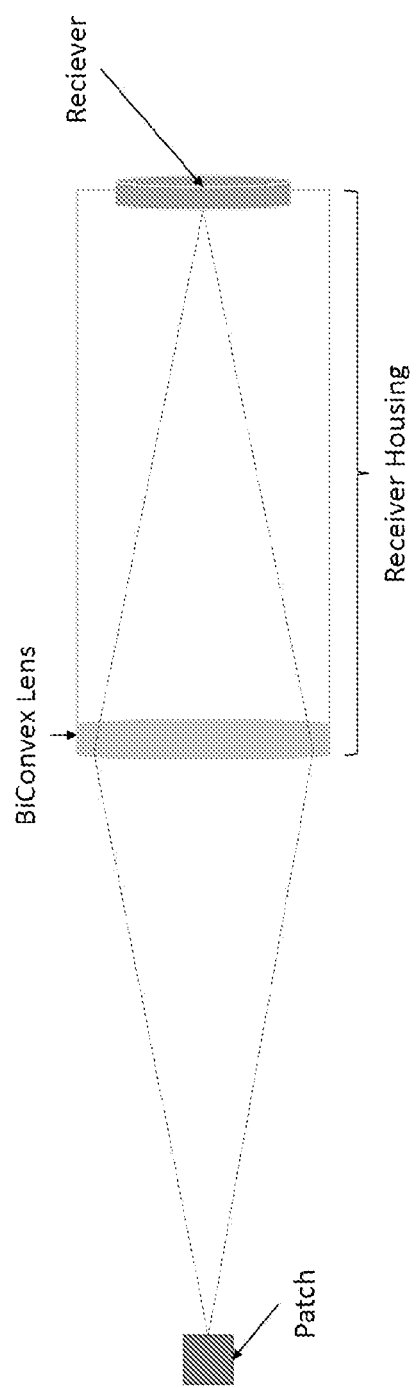
FIG. 11 is a schematic diagram of one embodiment of the receiver housing.

FIG. 11 is a schematic diagram of one embodiment of the receiver housing of the devices and methods of the present invention. The design of the receiver housing includes a receiver housing a biconvex lens and a receiver. The biconvex lens causes the reflected light to converge at the receiver.

Figure 12:
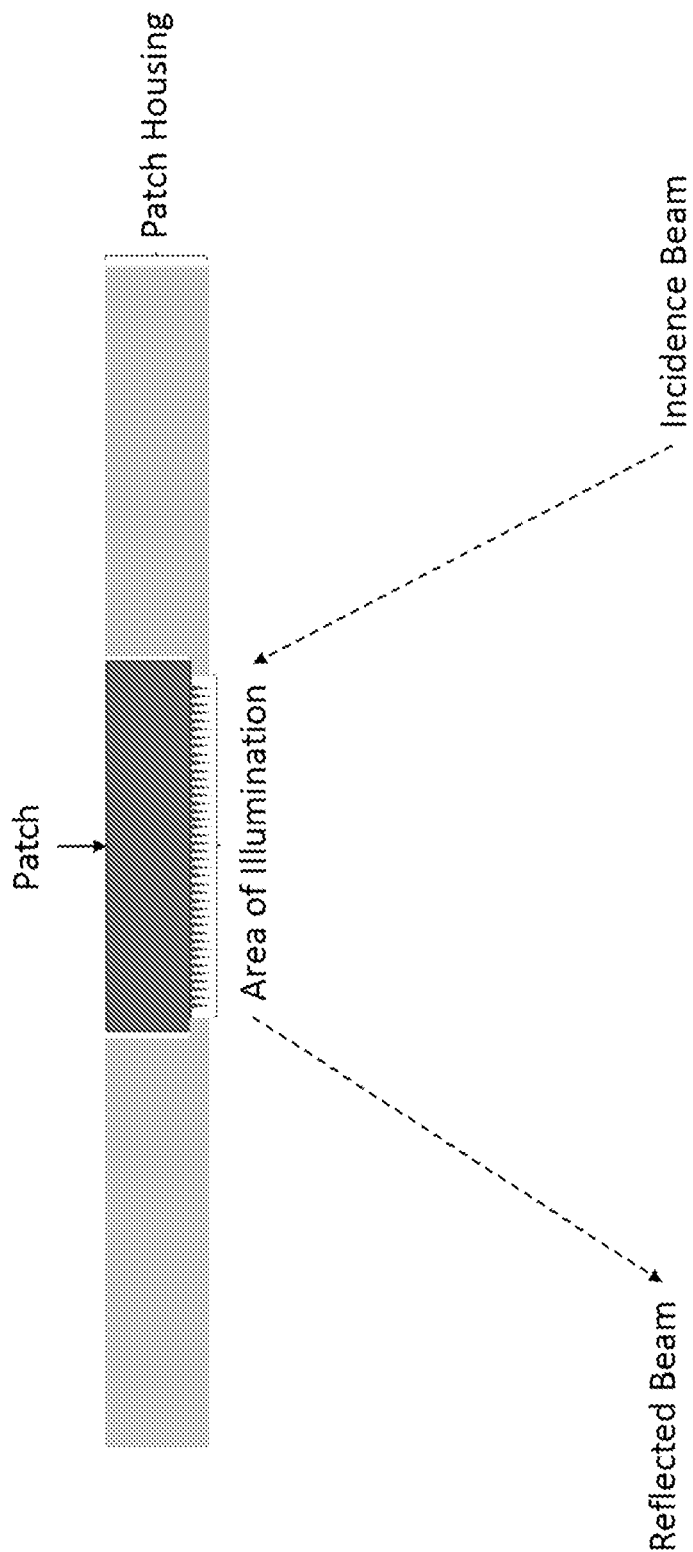
FIG. 12 is a schematic diagram of one embodiment of the patch mount.

FIG. 12 is a schematic diagram of one embodiment of the patch mount of the devices and methods of the present invention where the patch is displayed on or in a patch housing. The patch housing serves to hold the patch in place during the illumination of the patch. The area of illumination of the patch may be the entire patch or alternatively some portion of the patch.

FIGS. 14-17 are schematic diagrams of different aspects of one embodiment of the devices of the present invention.

Optionally a reference sensor as shown in FIGS. 8A and 8B can be incorporated into the design as a reference sensor may provide extra information such as a signal that is due to scattering rather than reflected light. Additionally the reference sensor might provide a reference signal that is essentially a surrogate measure of the incident laser intensity. This would potentially help stabilize the readings over time if the laser intensity drifts, or the optics setup shifts over time or deteriorates and or provide the ability to replicate results from system to system.

In one embodiment the signals from the sensor are normalized by measuring a blank (uncoated) patch prior to or simultaneously with measuring the signal for coated patches. The ratio of the coated patch signal to the uncoated patch signal may then be calculated.

As shown in FIG. 7, in one embodiment of the devices and methods of the present invention the radiation source is placed at an angle from the microarray patch such that the incident radiation hits the patch at angle where the light is reflected at an angle and detected by the sensor. As shown in FIG. 8A the angle of incidence of the radiation source with respect to the patch is 8°. FIG. 8B shows an alternative embodiment where the radiation source is normal to the patch.

It is also possible to illuminate at an angle such that using the geometry of the patch a shadow could be cast on the lower part of the projection and leave a signal that is primarily from the tips of the microprojections rather than from the base.

In alternative embodiments of the present invention a "spectral" measurement may be taken in which multiple wavelengths are monitored for intensity spectra which may be signatures of different components in the coating or the polymer patch.

Figure 21A:
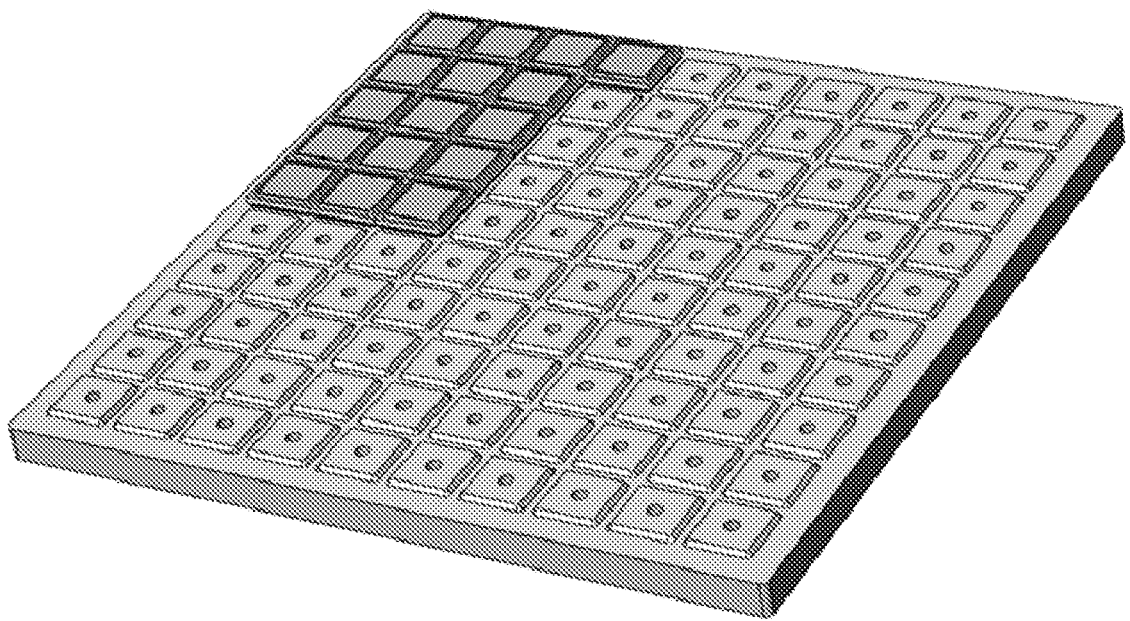
FIG. 21A is top-down view of an illustrated example of a patch mat.
Figure 21B:
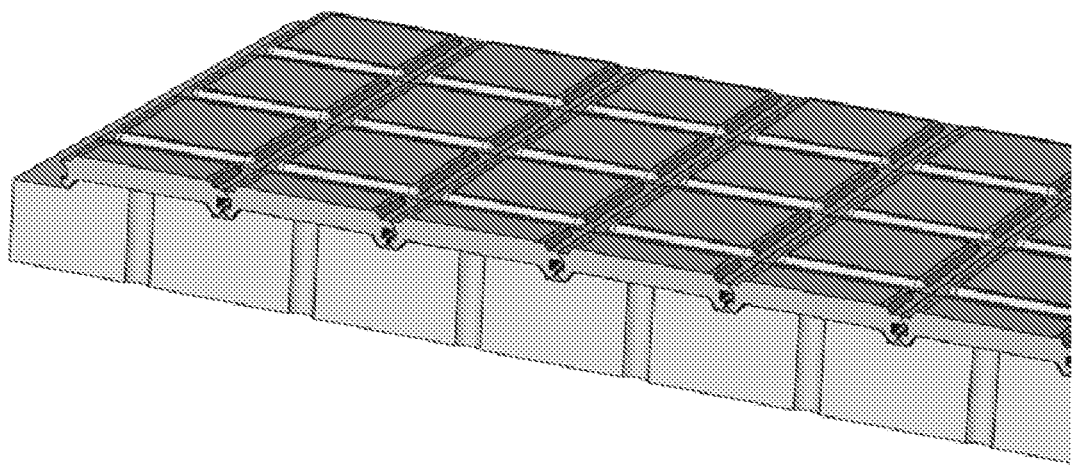
FIG. 21B is a side-view of an illustrated example of a patch mat.

As described above, the instruments, devices and methods of the present invention need to provide high throughput quality solutions for determining the coating on the microprojection arrays. This includes having the patches that will be coated in a format where they can be coated, checked for quality and transported easily. A method for providing patches that can be coated by commercial production is to interconnect the individual MAP's into compact mats that can be further stacked into a single compact body that requires minimal packaging (FIGS. 21A and 21B). The mats can be individually manipulated in an aseptic environment. The mat of patches can be coated as one unit thereby minimizing the instrument footprint. The patch mats provide in-plane cohesion of the patches, while allowing slight individual freedom of movement of the patch out of plane which enables each patch to be perfectly mated to the coating base. The patches can be individually detached from the mat by a pick-and-place robot. The patches of the patch mat may be coated using print head designs that utilize a piezoelectric stack actuator as the driving component to push a membrane plate such that the fluid in the pumping chamber is dispensed though a two-dimensional array of nozzles. The dispensed fluid is coated onto microprojections on a microprojection array as the nozzles are aligned with the microprojections on the array. The print head functions in the following way. The print head has a source of fluid from a reservoir which may be integral or externally located. Initially, the fluid from the reservoir to the nozzle is at a static condition, i.e., no flow. Between the reservoir and the nozzle, there are microfluidic conduits and a pumping chamber. The microfluidic conduits are responsible for replenishing fluid from the reservoir to the pumping chamber. The pumping chamber is responsible for pumping fluid out from the nozzle. At the nozzle exit, there is a meniscus or liquid/air interface defined by the nozzle exit geometry, which is some embodiments forms a round meniscus. The print head device may provide that each drop ejection cycle enable all the nozzles to simultaneously dispense a drop or a sequence of drops with a total volume in the range of 30 to 3000 picoLiters per nozzle. The print head may provide that each drop ejection cycle enable a single nozzle or subset of nozzles to dispense a drop or a sequence of drops.

Figure 22:
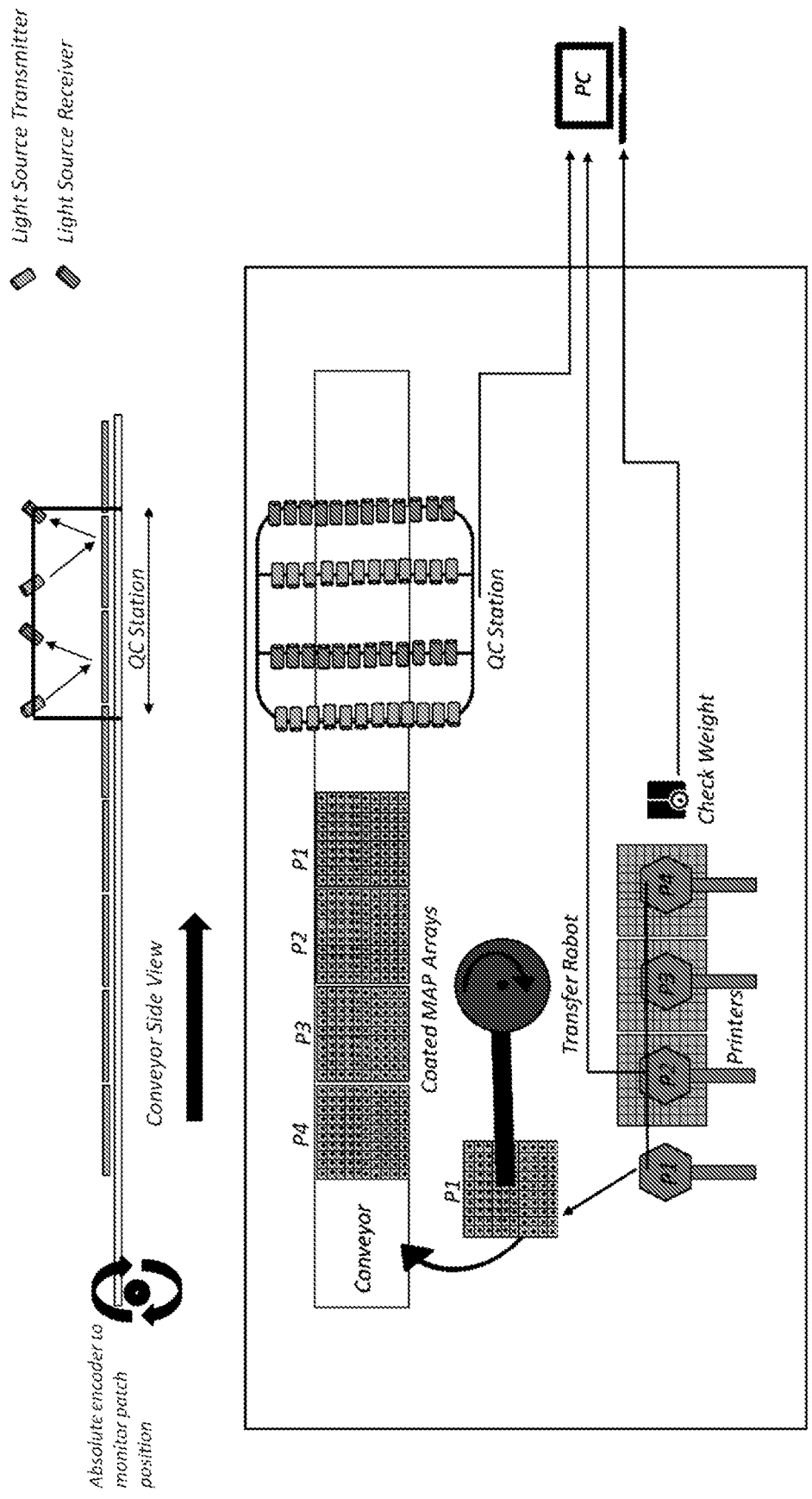
FIG. 22 is a schematic diagram of one embodiment of a quality control station where a mat of patches may be coated by multiple print heads and then conveyed to a quality control station where the patches can be checked for amount and position of coating on the microprojections.

FIG. 22 shows one scheme by which the patches on the patch mat are coated by a printer and transferred to a conveyer where the patches may be tested for quality by the devices and methods of the present invention.

The sequence begins with the system start up for each print head in which a start priming sequence is initiated to expel air from the print circuit. Once primed, printer will idle (tickle). The print head will print a single dispense onto a hydrophobic surface, image system counts drops, measures drop diameter and aligns print head to X,Y, axis and rotation. Drop size can be adjusted via PZT voltage.

Next an array of patches (Mat) is aligned under the print head, each patch is imaged and the position of the patch relative to axis is determined. Print head vision systems (P1 to P4) inspect patches and mark rejects (missing projections, no tips or damage). In addition periodic checks of drop mass dispense can be performed to confirm target dispense. The voltage supplied to PZT may be altered to achieve the mean dispensing value. Printing can then commence and a coating is built up on the microprojections by multiple passes depending on required dose. The printed mat of patches is then transferred to coating QC conveyor.

The mat patch passes under QC station and reflected light of various wavelengths may be used to collect data per patch. Such data may include where the coating is positioned on projection and estimates of the dispensed mass per patch. Mass may be calculated by reading fluorescence emitted from one component of a homogeneous coating material or the patch itself. This data from the fluorescence scan may be checked against the dispensed mass check for that print head to confirm the any deviations from the established protocol. Any out of specification patches are rejected at the patch insertion stage.

Figure 23:
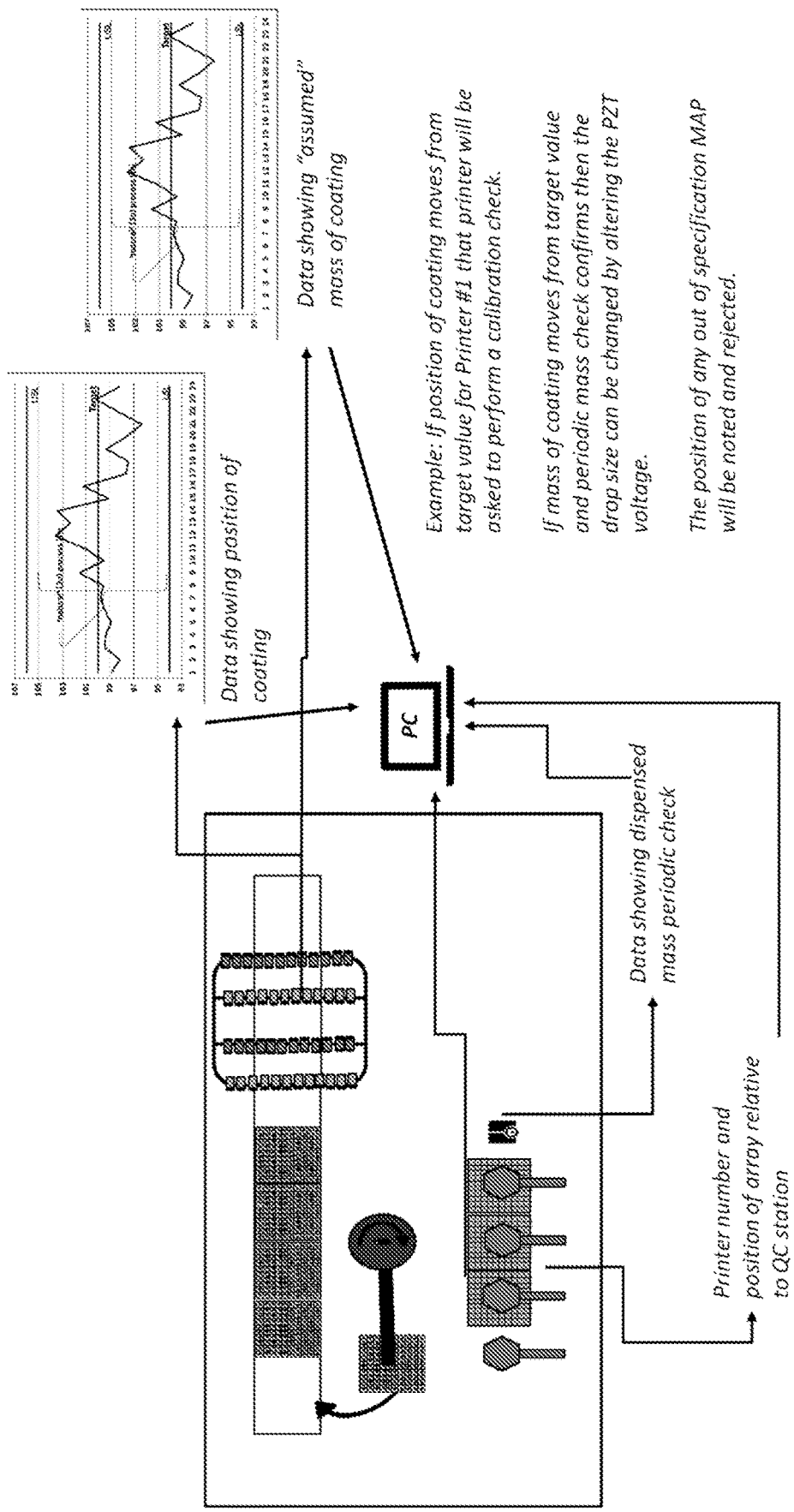
FIG. 23 is a schematic of one system that provides feedback information so that the coating of the MAPs performed by the print heads can be monitored and adjusted based on the data.

FIG. 23 is a schematic of one system that provides feedback information so that the coating of the MAPs performed by the print heads can be monitored and adjusted based on the data. The system is designed to respond to out of specification data by purging the print head and printing a single array to check drop size as well as clearing nozzles and adjusting position. PZT voltage can be adjusted to increase or decrease dispensed mass. If the position of the coating moves from a target value for a particular print head that print head will be asked to perform a calibration check.

In view of the above, it will be appreciated that a method for controlling the quality of coated microprojection arrays may include determining the amount of coating on microprojections of a coated microprojection array using the above described techniques, comparing the determined amount of coating to a coating specification; and rejecting the coated microprojection array if the determined amount of coating is outside of the coating specification.

Similarly, it will be appreciated that a system for controlling the quality of coated microprojection arrays may include a device that determines the amount of coating on microprojections of a coated microprojection array as described above, together with a processing system configured to receive from the device an indication of the determined amount of coating, compare the determined amount of coating to a coating specification and determine that the coated microprojection array should be rejected if the determined amount of coating is outside of the coating specification.

Within this disclosure, any indication that a feature is optional is intended provide adequate support (e.g., under 35 U.S.C. 112 or Art. 83 and 84 of EPC) for claims that include closed or exclusive or negative language with reference to the optional feature. Exclusive language specifically excludes the particular recited feature from including any additional subject matter. For example, if it is indicated that A can be drug X, such language is intended to provide support for a claim that explicitly specifies that A consists of X alone, or that A does not include any other drugs besides X. "Negative" language explicitly excludes the optional feature itself from the scope of the claims. For example, if it is indicated that element A can include X, such language is intended to provide support for a claim that explicitly specifies that A does not include X. Non-limiting examples of exclusive or negative terms include "only," "solely," "consisting of," "consisting essentially of," "alone," "without", "in the absence of (e.g., other items of the same type, structure and/or function)" "excluding," "not including", "not", "cannot," or any combination and/or variation of such language.

Similarly, referents such as "a," "an," "said," or "the," are intended to support both single and/or plural occurrences unless the context indicates otherwise. For example "a dog" is intended to include support for one dog, no more than one dog, at least one dog, a plurality of dogs, etc. Non-limiting examples of qualifying terms that indicate singularity include "a single", "one," "alone", "only one," "not more than one", etc. Non-limiting examples of qualifying terms that indicate (potential or actual) plurality include "at least one," "one or more," "more than one," "two or more," "a multiplicity," "a plurality," "any combination of," "any permutation of," "any one or more of," etc. Claims or descriptions that include "or" between one or more members of a group are considered satisfied if one, more than one, or all of the group members are present in, employed in, or otherwise relevant to a given product or process unless indicated to the contrary or otherwise evident from the context.

Where ranges are given herein, the endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means ±20%.

While this invention has been particularly shown and described with references to example embodiments thereof, it will be understood by those skilled in the art that the various changes in form and details may be made therein without departing from the scope of the invention encompassed by the appended claims.

A better understanding of the present invention and of its many advantages will be had from the following examples, given by way of illustration.

EXAMPLES

Example 1

Normalized Reflectance

A range of coating performance was obtained by creating three different groups of microprojection patch arrays. Each patch was coated with 6 drops of 14 C labelled vaccine per projection. The three groups were then manufactured as follows: In group I six drops were targeted to the tips of the microprojections; in group II, three drops were targeted to tips of the microprojections and three drops targeted to the base; and in group III, six drops were targeted to the base and no drops targeted to the micro projections. Multiple replicates of each group were manufactured. As the process for targeting the drops to particular portions of the array cannot as yet be perfectly replicated there was a spread of coating performance instead of simply three clusters at 0%, 50% and 100% coating. These microprojection arrays were made in duplicate (TN821 and TN 848). Both sets of microarrays were subjected to reflectance measurements as were microarrays which were uncoated.

The quantitation of the coating for a first set (TN 821) of microarrays was measured by a membrane transfer method where a porous 100 micron thick membrane is used to remove the coated material from the top 100 microns of the projections. The membrane (PVDF with 0.4 micron pores) was hydrated with ¼ strength phosphate buffer and placed against a rigid surface (e.g. glass slides). The patch was placed with the projection side facing the membrane and a pneumatic press was used to press the projections into the membrane for 5 seconds at 40 PSI. Projections penetrate the membrane and stop when the microprojection tips reach the glass surface. Thus, the thickness of the membrane and the pressure (to some extent) control the penetration of the microprojections into the membrane. The coating transfers to the membrane where it was retained due to the hydrophobic interactions between the coating and the membrane. The membrane is hydrated and is a high protein binding membrane traditionally used in blotting techniques for protein analysis. The remaining material (that was not transferred to the membrane) was eluted from the patch and the material bound to the membrane was quantified by using scintillation counting.

Figure 13:
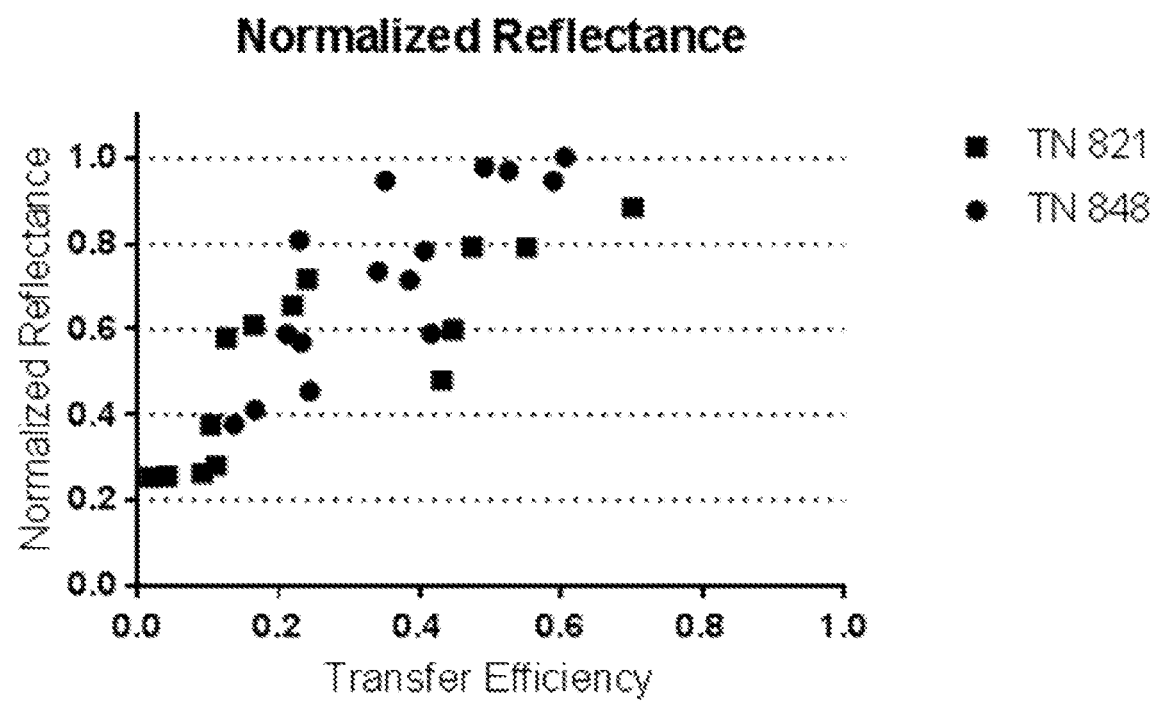
FIG. 13 is a plot of normalized reflectance versus coating transfer efficiency.
Figure 14:
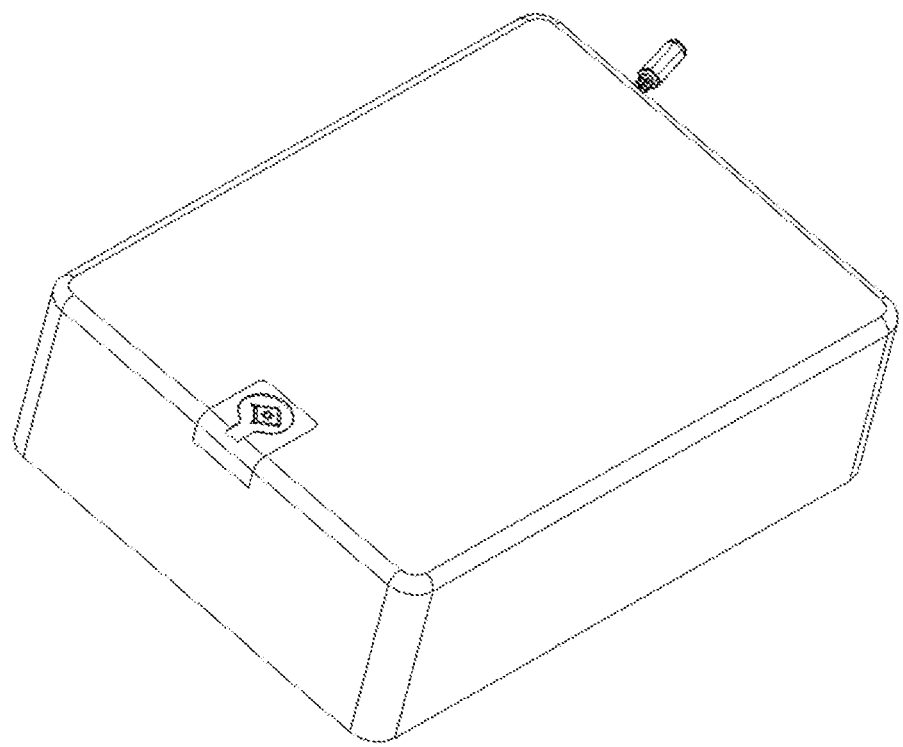
FIG. 14 is a schematic diagram of one embodiment of the housing of the device.
Figure 15:
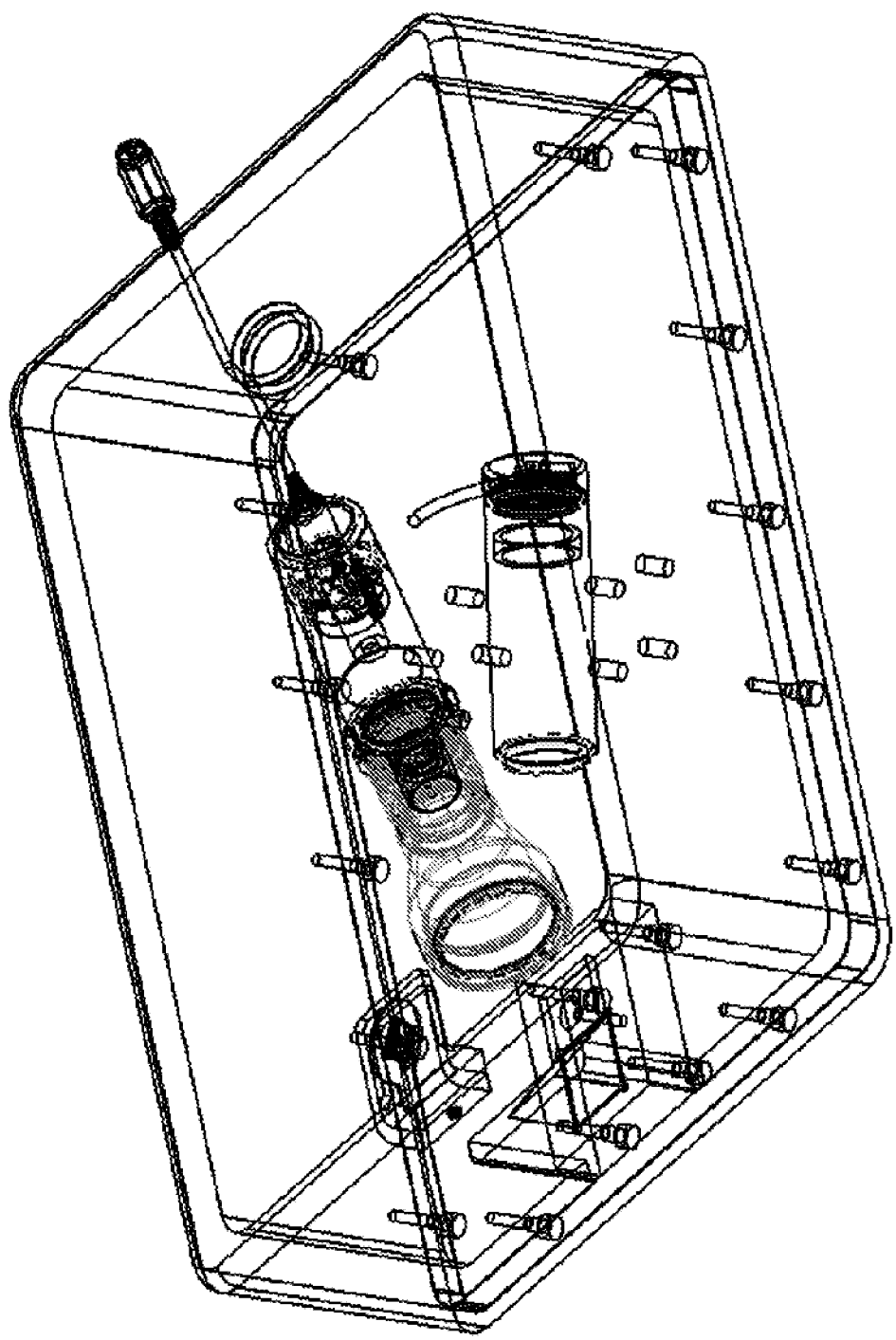
FIG. 15 is a schematic diagram of one embodiment of the device as viewed through the housing of the device.
Figure 16:
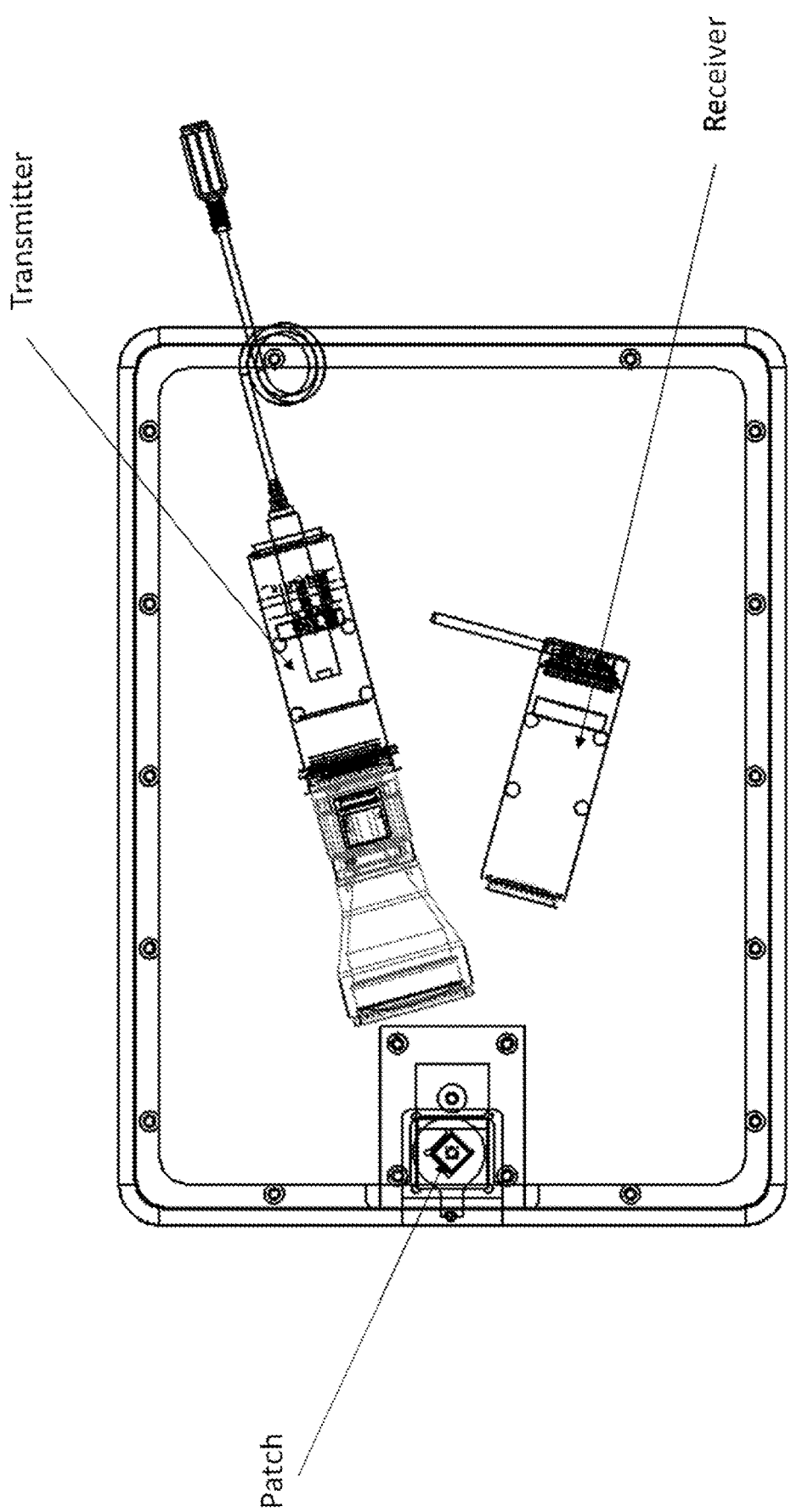
FIG. 16 is a schematic diagram of one embodiment of the device as viewed through the top of the housing of the device.
Figure 17A:
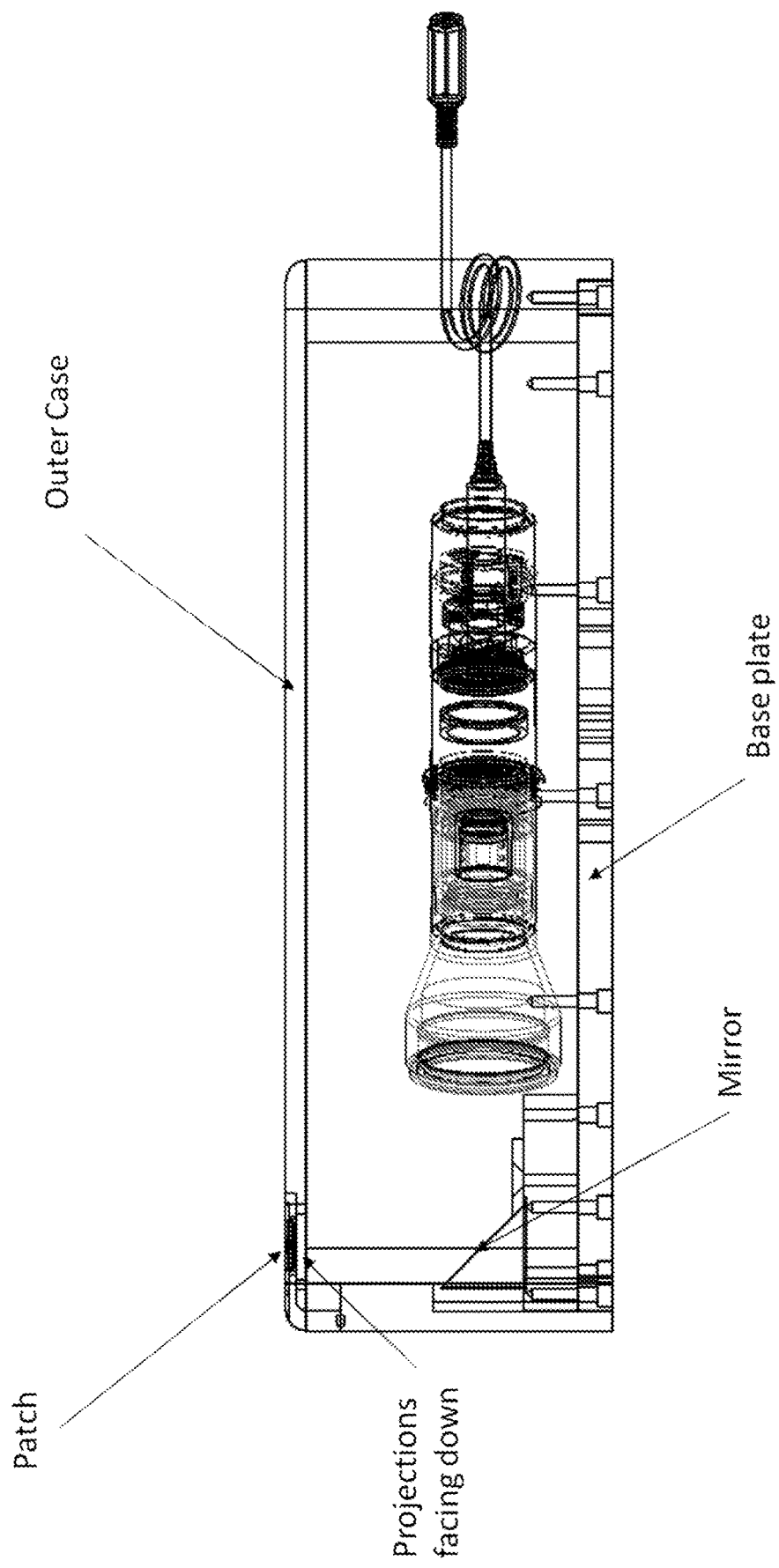
FIG. 17A is a schematic diagram of one embodiment of the device as viewed through the side of the housing of the device.
Figure 17B:
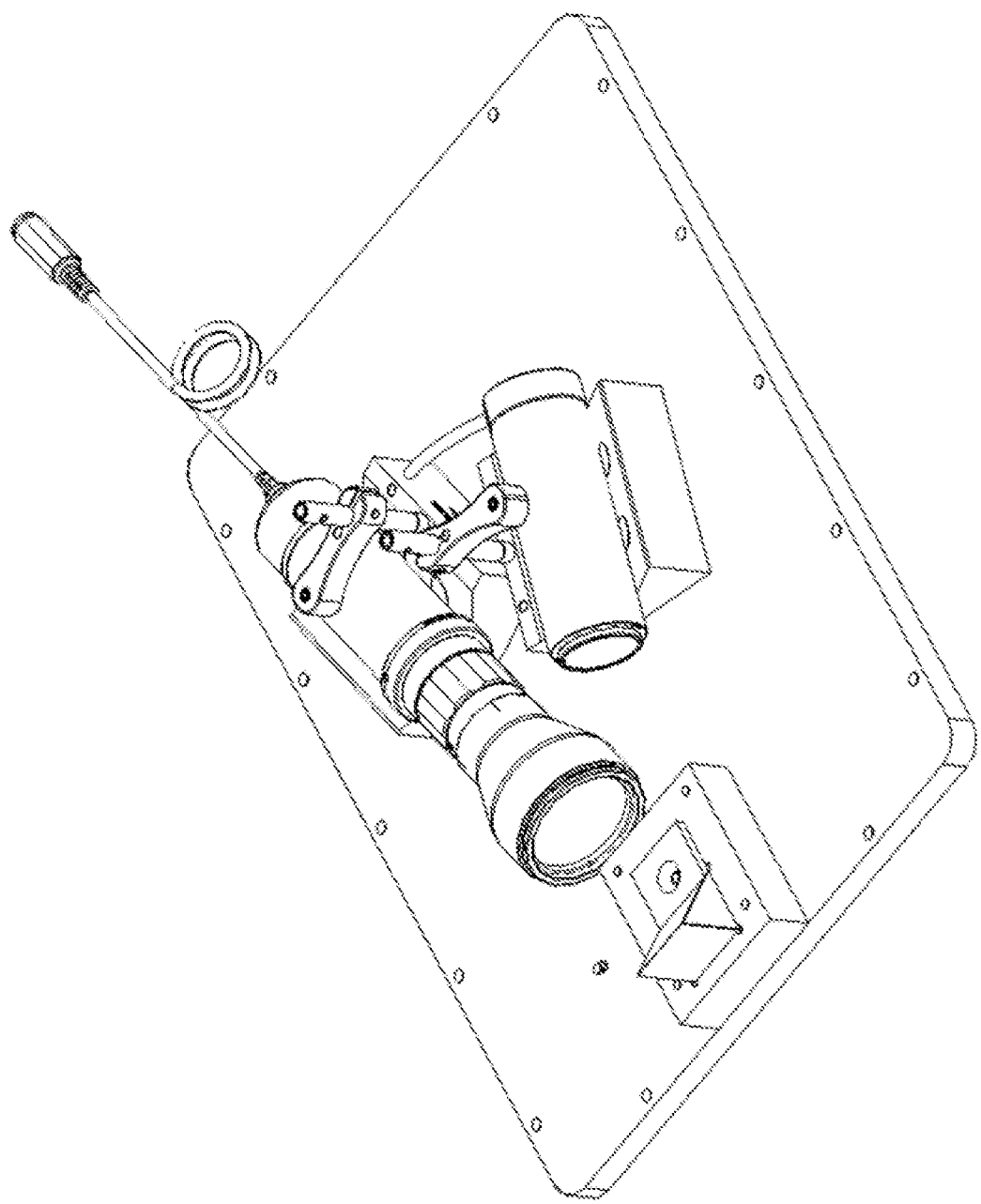
FIG. 17B is a schematic diagram of one embodiment of the device without the housing.

The results of the reflectance studies are show in FIG. 13. The red squares correspond to TN 821 in which the reflectance was measured and normalized to a microarray having no coating and then the microarrays were subjected to membrane transfer. The green squares correspond to TN 848 821 in which only the reflectance was measured and compared to the values generated for TN 821. The plot demonstrates that the reflectance methods of the present invention may be used to quantitate the transfer of coating to microprojections.

Example 2

Large Spot Reflectance

Figure 18A:
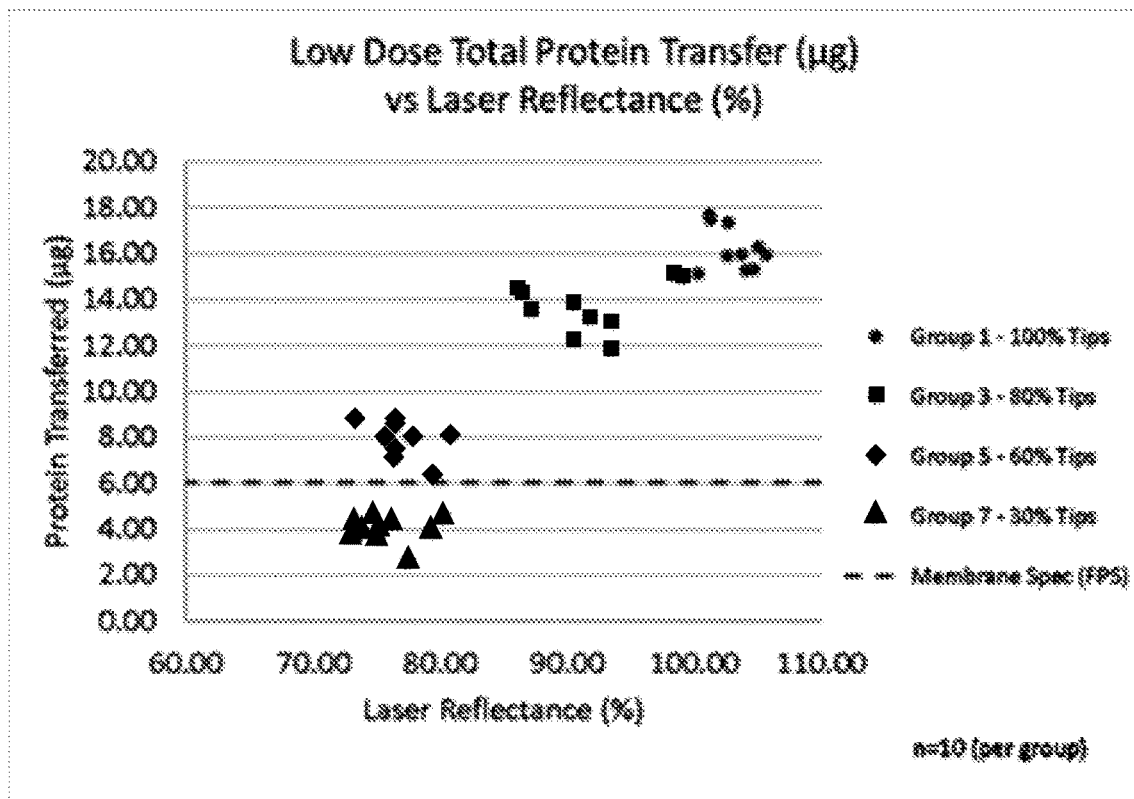
FIG. 18A is a plot of low dose total protein transfer (µg) versus laser reflectance (%)
Figure 18B:
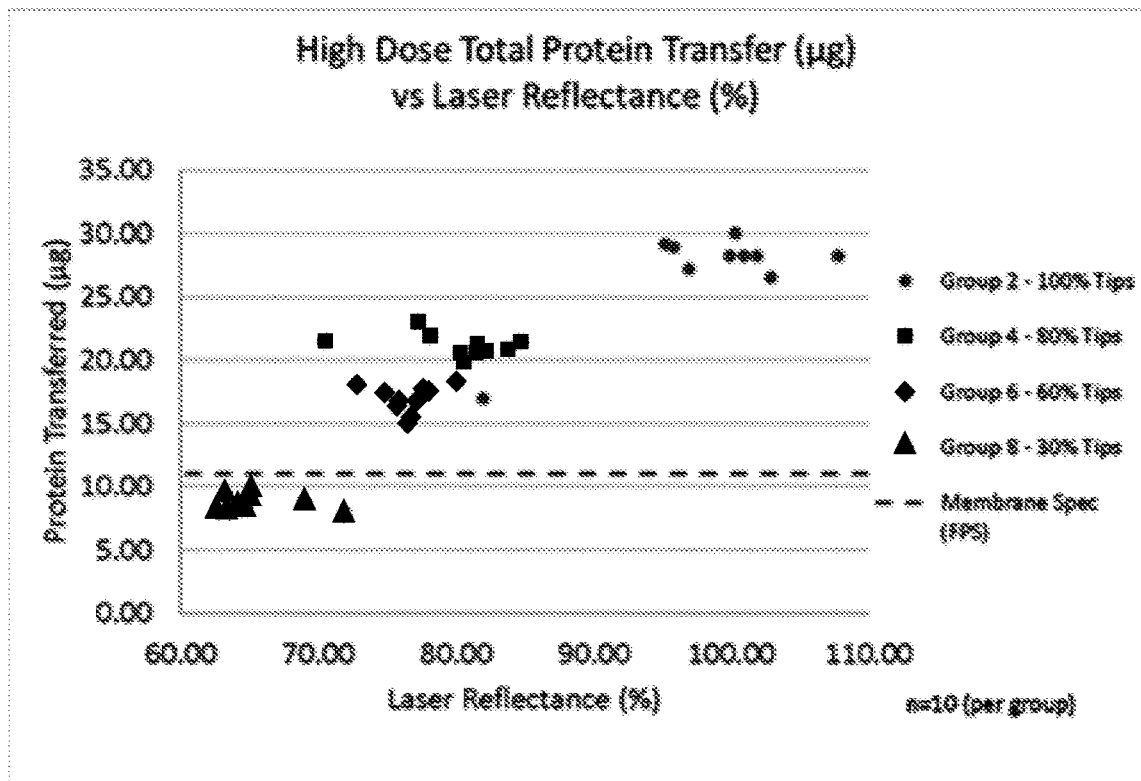
FIG. 18B is a plot of high dose total protein transfer (µg) versus laser reflectance (%).

Eight MAPs were coated respectively with the following coatings: 30%, 60%, 80% and 100% high dose coating and 30%, 60%, 80% and 100% low dose coating. A laser source illuminated a 7 mm spot on the microprojection array and reflectance was measured. The amount of coating was plotted versus reflectance as seen in FIGS. 18A and 18B. A Laser Acceptance Threshold can be established by calculating a "mean+4×standard deviation" (99.993% confidence interval) by bracketing the coating transfer specification limits which can be determined by the type of device used to coat the substrate and the amount of coating required for a particular purpose. In this example doses 5 and 7 were selected for the lower end and 6 and 8 were selected for the higher end. FIG. 19 shows a table of the acceptance calculations.

Example 3

Spatially Resolved QC Measurements

A single MAP was coated with 4 different tip targeting accuracies as shown in FIG. 20A with one quadrant with 100% tip coating, a second quadrant with 66.7% tip coating, a third quadrant with 33.3% tip coating, and a fourth quadrant with 0% tip coating. "Point-scan" Laser beam (~1 mm Dia.) scanned throughout patch and corresponding Laser reflectance measurements were made. The loss in laser reflectance is plotted in heat map as shown in FIG. 20B. Point-scan measurements are used to distinguish spatial coating variations within a single patch.

The claims defining the invention are as follows:

1. A device for measuring the coating on microprojections on a microprojection array, the device comprising:
    a microprojection array housing for mounting the microprojection array;
    a laser diode for illuminating the microprojection array;
    an aspheric lens;
    a beam shaping diffuser;
    a focusing lens wherein the aspheric lens is positioned between the laser diode and the beam shaping diffuser and the beam shaping diffuser is positioned between the aspheric lens and the focusing lens and the focusing lens is positioned between the beam shaping filter and the microprojection array housing;
    a bi-convex lens;
    one or more sensors for detecting reflected light from the microprojection array, wherein the bi-convex lens is positioned between the microprojection array housing and the one or more sensors; and
    a power meter connected to the one or more sensors.

2. The device of claim 1, further comprising a microarray mounting station.

3. The device of claim 2, further comprising one or more microarrays.

4. The device of claim 1, wherein the laser diode emits electromagnetic radiation at about 635 nm.

5. The device of claim 1, further comprising an aperture positioned between the focusing lens and the microprojection array housing.

6. The device of claim 1, further comprising a mirror positioned between the aperture and the microprojection array housing.

7. The device of claim 1, further comprising a reference sensor.

8. The device of claim 1, wherein the number of sensors is four.

9. The device of claim 1, wherein the one or more sensors are at approximately 45 degree downward angle to the microprojections and at 45 degrees out of alignment with the rows of microprojections.

10. The device of claim 9, wherein the laser diode is substantially perpendicular to the microprojection array.

11. The device of claim 9, wherein the laser diode is aligned over the microprojection array such that the angle relative to the microprojections is less than 5°.

* * * * *

UNITED STATES PATENT AND TRADEMARK OFFICE
CERTIFICATE OF CORRECTION

PATENT NO. : 11,175,128 B2
APPLICATION NO. : 16/622092
DATED : November 16, 2021
INVENTOR(S) : Michael Carl Junger et al.

It is certified that error appears in the above-identified patent and that said Letters Patent is hereby corrected as shown below:

On the Title Page

Page 3, Item (56) References Cited/U.S. Patent Documents:
"2006/0000743 A1 4/2006 Kwon" should read: --2006/0074376 A1 4/2006 Kwon--.

Page 3, Item (56) References Cited/Other Publications:
"2014/0002763 A1 9/2014 Bourne et al." should read: --2014/0276366 A1 9/2014 Bourne et al.--.

Signed and Sealed this
Sixteenth Day of May, 2023

Katherine Kelly Vidal
*Director of the United States Patent and Trademark Office*